(12) United States Patent
Chi et al.

(10) Patent No.: US 12,202,152 B2
(45) Date of Patent: Jan. 21, 2025

(54) VISUAL PERCEPTION DEVICE BASED SPATIAL CALIBRATION METHOD AND APPARATUS FOR ROBOT BODY COORDINATE SYSTEM, AND STORAGE MEDIUM

(71) Applicant: Tencent Technology (Shenzhen) Company Limited, Guangdong (CN)

(72) Inventors: Wanchao Chi, Shenzhen (CN); Le Chen, Shenzhen (CN); Yonggen Ling, Shenzhen (CN); Shenghao Zhang, Shenzhen (CN); Yu Zheng, Shenzhen (CN); Xinyang Jiang, Shenzhen (CN); Zhengyou Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 360 days.

(21) Appl. No.: 17/734,629

(22) Filed: May 2, 2022

(65) Prior Publication Data

US 2022/0258356 A1    Aug. 18, 2022

Related U.S. Application Data

(63) Continuation of application No. PCT/CN2021/084229, filed on Mar. 31, 2021.

(30) Foreign Application Priority Data

Apr. 28, 2020    (CN) .......................... 202010351422

(51) Int. Cl.
 *B25J 9/16* (2006.01)
 *B25J 19/02* (2006.01)
 *B62D 57/032* (2006.01)

(52) U.S. Cl.
CPC ........... *B25J 9/1697* (2013.01); *B25J 9/1602* (2013.01); *B25J 9/1692* (2013.01); *B25J 19/023* (2013.01); *B62D 57/032* (2013.01)

(58) Field of Classification Search
CPC ...... B25J 9/1697; B25J 9/1602; B25J 9/1692; B25J 19/023; B25J 9/1656; B62D 57/032;
(Continued)

(56) References Cited

U.S. PATENT DOCUMENTS

| 10,628,966 B1 | 4/2020 | Islam et al. |
| 2018/0297215 A1 | 10/2018 | Oberlin et al. |
| 2022/0357153 A1* | 11/2022 | Konishi ................. G01B 11/24 |

FOREIGN PATENT DOCUMENTS

| CN | 104864807 A | 8/2016 |
| CN | 107253190 A | 10/2017 |

(Continued)

OTHER PUBLICATIONS

Automatic work objects calibration, Schmidt et al, 2014 (Year: 2014).*

(Continued)

*Primary Examiner* — Jianxun Yang
(74) *Attorney, Agent, or Firm* — Banner & Witcoff, Ltd.

(57) ABSTRACT

This disclosure relates to a spatial calibration method and apparatus of a robot ontology coordinate system based on a visual perception device and a storage medium. The method includes: obtaining first transformation relationships; obtaining second transformation relationships; using a transformation relationship between a visual perception coordinate system and an ontology coordinate system as an unknown variable; and resolving the unknown variable based on an equivalence relationship between a transformation relationship obtained according to the first transformation relationships and the unknown variable and a transfor- (Continued)

mation relationship obtained according to the second transformation relationships and the unknown variable, to obtain the transformation relationship between the visual perception coordinate system and the ontology coordinate system.

20 Claims, 6 Drawing Sheets

(58) Field of Classification Search
CPC ........... G05B 2219/37009; G05B 2219/39008; G05B 2219/39057
See application file for complete search history.

(56) References Cited

FOREIGN PATENT DOCUMENTS

| | | | |
|---|---|---|---|
| CN | 108748146 A | 11/2018 | |
| CN | 109304710 A | 2/2019 | |
| CN | 109910016 A | 6/2019 | |
| CN | 110000790 A | 7/2019 | |
| CN | 110842914 A | 2/2020 | |
| CN | 110919658 A | 3/2020 | |
| CN | 111070199 A | 4/2020 | |
| CN | 111515950 A | 8/2020 | |
| WO | WO 93/05479 A1 | 3/1993 | |
| WO | WO 2021/218542 A1 | 11/2021 | |

OTHER PUBLICATIONS

Search Report for Chinse application No. 202010351422.9 dated Apr. 16, 2021, 3p, in Chinese language.
First Office Action for Chinese application No. 202010351422.9 dated Apr. 26, 2021, 12p, in Chinese language.
Second Office Action for Chinese application No. 202010351422.9 dated Nov. 15, 2021, 17p, in Chinese language.
International Search Report and Written Opinion for priority application No. PCT/CN2021/084229 dated Jun. 3, 2021, 11p, in Chinese language.
English language translation of the International Search Report for priority application No. PCT/CN2021/084229 dated Jun. 3, 2021, 3p.
Concise Explanation of Relevancy for A15, A16, A17, A18, A21, and A22.
Chen, Bao-cun et al., "Automatic Hand-Eye Calibration System of Robot based on ROS", *China Academic Journal Electronic Publishing House*, Feb. 29, 2020, pp. 343-348, ISSN 1006-9348, with English abstract.
Yang, Chi Chang, "Research on Binocular Stereoscopic Vision Eye Calibration", Jul. 15, 2019, 65p., ISSN 1674-0246, with English Abstract.

* cited by examiner

VISUAL PERCEPTION DEVICE BASED SPATIAL CALIBRATION METHOD AND APPARATUS FOR ROBOT BODY COORDINATE SYSTEM, AND STORAGE MEDIUM

RELATED DISCLOSURE

This application is a continuation of International Application No. PCT/CN2021/084229, filed Mar. 31, 2021, which claims priority to Chinese Patent Disclosure No. 202010351422.9, entitled "METHOD AND APPARATUS FOR DETERMINING ROBOT COORDINATE SYSTEM TRANSFORMATION RELATIONSHIP, DEVICE, AND STORAGE MEDIUM" and filed with the China National Intellectual Property Administration on Apr. 28, 2020. The disclosures above are incorporated herein by reference in their entireties.

TECHNICAL FIELD

This disclosure relates to the field of robot technologies, and in particular, to a spatial calibration method and apparatus of a robot ontology coordinate system based on a visual perception device and a storage medium.

BACKGROUND

With the development of science and technologies, robots are increasingly common in daily life and industries, for example, industrial robots may be used to replace human for manual labor.

Currently, during operation, a robot usually perceives the external environment by using a visual perception device, and controls, by using a control system according to the perceived external environment, a motion mechanism to move. However, a coordinate system used by the visual perception device to perceive the environment is different from an ontology coordinate system referenced when the control system controls the motion mechanism of the robot to move. Therefore, the ontology coordinate system of the robot needs to be calibrated, so as to determine a transformation relationship between the coordinate system corresponding to the visual perception device and the ontology coordinate system. However, there is often a problem that the calibration efficiency is relatively low.

SUMMARY

The embodiments of this disclosure provide a spatial calibration method and apparatus of a robot ontology coordinate system based on a visual perception device, a device, and a storage medium.

A spatial calibration method of a robot ontology coordinate system based on a visual perception device is provided, performed by a computer device, the method including:

obtaining first transformation relationships, the first transformation relationships including:

a transformation relationship between a calibration object coordinate system and a visual perception coordinate system when a target motion mechanism of a robot is located at a first sampling point, and a transformation relationship between a motion mechanism coordinate system and an ontology coordinate system when the target motion mechanism of the robot is located at the first sampling point;

obtaining second transformation relationships, the second transformation relationships including:

a transformation relationship between the calibration object coordinate system and the visual perception coordinate system when the target motion mechanism is located at a second sampling point, and a transformation relationship between the motion mechanism coordinate system and the ontology coordinate system when the target motion mechanism is located at the second sampling point; and deriving a target transformation relationship based on an equivalence relationship between a transformation relationship obtained according to the first transformation relationships and the target transformation relationship and a transformation relationship obtained according to the second transformation relationships and the target transformation relationship, the target transformation relationship being a transformation relationship between the visual perception coordinate system and the ontology coordinate system, and a target calibration object corresponding to the calibration object coordinate system being disposed on the target motion mechanism.

A spatial calibration apparatus of a robot ontology coordinate system based on a visual perception device is provided, including: a first transformation relationship obtaining module, configured to obtain first transformation relationships, the first transformation relationships being a transformation relationship between a calibration object coordinate system and a visual perception coordinate system and a transformation relationship between a motion mechanism coordinate system and an ontology coordinate system in a case that a target motion mechanism of a robot is located at a first sampling point; a second transformation relationship obtaining module, configured to obtain second transformation relationships, the second transformation relationships being a transformation relationship between the calibration object coordinate system and the visual perception coordinate system and a transformation relationship between the motion mechanism coordinate system and the ontology coordinate system in a case that the target motion mechanism is located at a second sampling point; and a resolving module, configured to resolve an unknown variable based on an equivalence relationship between a transformation relationship obtained according to the first transformation relationships and the unknown variable and a transformation relationship obtained according to the second transformation relationships and the unknown variable, to obtain a transformation relationship between the visual perception coordinate system and the ontology coordinate system, the unknown variable being the transformation relationship between the visual perception coordinate system and the ontology coordinate system, and a target calibration object corresponding to the calibration object coordinate system being disposed on the target motion mechanism.

In some embodiments, the resolving module includes: a first calculation result obtaining unit, configured to obtain a first calculation result through calculation according to transformation relationships between the calibration object coordinate system and the visual perception coordinate system when the target motion mechanism is located respectively at the first sampling point and the second sampling point; a second calculation result obtaining unit, configured to obtain a second calculation result through calculation according to transformation relationships between the motion mechanism coordinate system and the ontology coordinate system when the target motion mechanism is located respectively at the first sampling point and the second sampling point; and a resolving unit, configured to resolve the unknown variable based on an equivalence relationship between a value calculated according to the first calculation result and the unknown variable and a value calculated according to the second calculation result and the unknown variable, to obtain the transformation relationship between the visual perception coordinate system and the ontology coordinate system.

In some embodiments, the resolving unit is configured to: obtain a current solution corresponding to the unknown variable; obtain a first current value through calculation according to the current solution and the first calculation result, and obtain a second current value through calculation according to the current solution and the second calculation result; obtain a difference calculation result according to a difference between the first current value and the second current value, and adjust the current solution in a direction of making the difference calculation result smaller, to obtain an updated current solution; and return to the operation of obtaining the first current value through calculation according to the current solution and the first calculation result, and obtaining the second current value through calculation according to the current solution and the second calculation result, until the difference calculation result is less than a first threshold, and use the current solution as the transformation relationship between the visual perception coordinate system and the ontology coordinate system.

In some embodiments, the second calculation result obtaining unit is configured to: obtain a transformation relationship from the motion mechanism coordinate system to the ontology coordinate system when the target motion mechanism is located at the first sampling point, and use the transformation relationship as a first known value; obtain a transformation relationship from the ontology coordinate system to the motion mechanism coordinate system when the target motion mechanism is located at the second sampling point, and use the transformation relationship as a second known value; and multiply the first known value by the second known value, to obtain the second calculation result.

In some embodiments, the first transformation relationship obtaining module is configured to: obtain a projection matrix corresponding to a visual perception device; and perform calculation according to the projection matrix and a transformation relationship between the calibration object coordinate system and an image coordinate system when the target motion mechanism is located at the first sampling point, to obtain the transformation relationship between the calibration object coordinate system and the visual perception coordinate system when the target motion mechanism is located at the first sampling point.

In some embodiments, the first transformation relationship obtaining module is configured to: move the target motion mechanism to the first sampling point, and control the visual perception device to perform image acquisition on the target calibration object, to obtain a target image; and obtain, according to coordinates of the target calibration object in the target image and a size parameter corresponding to the target calibration object, the transformation relationship between the calibration object coordinate system and the image coordinate system when the target motion mechanism is located at the first sampling point.

In some embodiments, the first transformation relationship obtaining module is configured to: obtain a transformation relationship between coordinate systems of adjacent joints in a joint sequence corresponding to the target motion mechanism when the target motion mechanism is located at the first sampling point, to obtain an adjacent transformation relationship set; and perform multiplication on transformation relationships in the adjacent transformation relationship set according to an arrangement sequence of joints in the joint sequence, to obtain the transformation relationship between the motion mechanism coordinate system and the ontology coordinate system when the target motion mechanism is located at the first sampling point.

A computer device is provided, including a memory and a processor, the memory storing computer-readable instructions, the computer-readable instructions, when executed by the processor, causing the processor to perform the operations of the spatial calibration method of a robot ontology coordinate system based on a visual perception device.

One or more non-transitory storage media storing computer-readable instructions are provided, the computer-readable instructions, when executed by one or more processors, causing the one or more processors to perform the operations of the spatial calibration method of a robot ontology coordinate system based on a visual perception device.

A robot control method is provided, performed by a computer device, the method including: obtaining visual pose information of a target object in a visual perception coordinate system corresponding to a robot;

obtaining a target transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships;

obtaining target pose information corresponding to the target object according to the visual pose information and the transformation relationship between the visual perception coordinate system and the ontology coordinate system; and controlling, according to the target pose information, a target motion mechanism of the robot to move, the first transformation relationships and the second transformation relationships respectively including:

transformation relationships between a calibration object coordinate system and the visual perception coordinate system; and transformation relationships between a motion mechanism coordinate system and the ontology coordinate system when the target motion mechanism is located at different sampling points.

A robot control apparatus is provided, including: a visual pose information obtaining module, configured to obtain visual pose information of a target object in a visual perception coordinate system corresponding to a robot; a third transformation relationship obtaining module, configured to obtain a transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships; a target pose information obtaining module, configured to obtain target pose information corresponding to the target object according to the visual pose information and the transformation relationship between the visual perception coordinate system and the ontology coordinate system; and a control module, configured to control, according to the target pose information, a target motion mechanism of the robot to move, the first transformation relationships and the second transformation relationships being transformation relationships between a calibration object coordinate system and the visual perception coordinate system and transformation relationships between a motion mechanism coordinate system and the ontology coordinate system when the target motion mechanism is located at different sampling points, and a target calibration object corresponding to the calibration object coordinate system being disposed on the target motion mechanism during calibration.

A computer device, comprising a memory and a processor, the memory storing computer-readable instructions, the processor, when executing the computer-readable instructions, causing the computer to perform steps including:

perception device, performed by a computer device, the method comprising:

obtaining first transformation relationships, the first transformation relationships including:
a transformation relationship between a calibration object coordinate system and a visual perception coordinate system, and
a transformation relationship between a motion mechanism coordinate system and an ontology coordinate system when a target motion mechanism of a robot is located at a first sampling point;

obtaining second transformation relationships, the second transformation relationships including:
a transformation relationship between the calibration object coordinate system and the visual perception coordinate system, and
a transformation relationship between the motion mechanism coordinate system and the ontology coordinate system when the target motion mechanism is located at a second sampling point; and obtaining a target transformation relationship based on an equivalence relationship between a transformation relationship obtained according to the first transformation relationships and the target transformation relationship and a transformation relationship obtained according to the second transformation relationships and the target transformation relationship, the target transformation relationship being a transformation relationship between the visual perception coordinate system and the ontology coordinate system, and a target calibration object corresponding to the calibration object coordinate system being disposed on the target motion mechanism.

A robot, comprising a memory and a processor, the memory storing computer-readable instructions, the processor, when executing the computer-readable instructions, controlling the robot by steps including:

obtaining visual pose information of a target object in a visual perception coordinate system corresponding to a robot;

obtaining a target transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships;

obtaining target pose information corresponding to the target object according to the visual pose information and the transformation relationship between the visual perception coordinate system and the ontology coordinate system; and controlling, according to the target pose information, a target motion mechanism of the robot to move, the first transformation relationships and the second transformation relationships respectively including:
transformation relationships between a calibration object coordinate system and the visual perception coordinate system; and
transformation relationships between a motion mechanism coordinate system and the ontology coordinate system when the target motion mechanism is located at different sampling points.

One or more non-transitory storage media storing computer-readable instructions are provided, the computer-readable instructions, when executed by one or more processors, causing the one or more processors to perform the operations of the robot control method.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

Figure 1:
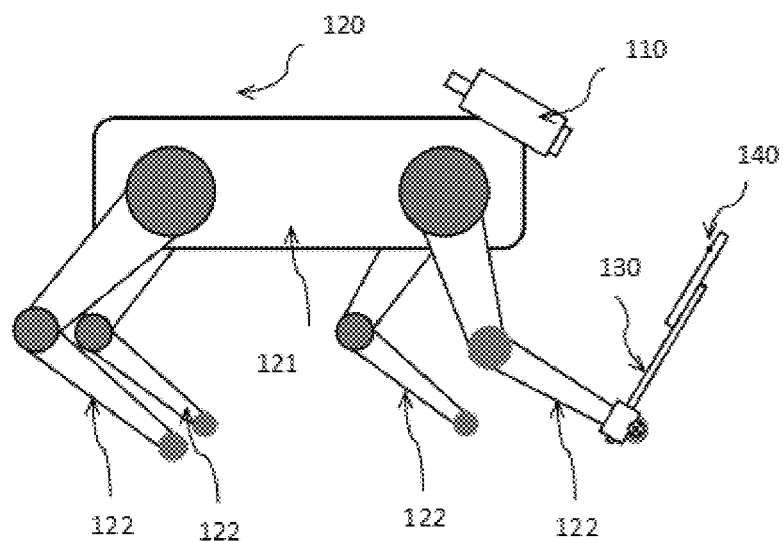
FIG. 1 is a diagram of an disclosure environment of a spatial calibration method of a robot ontology coordinate system based on a visual perception device according to some embodiments.

To make the objectives, technical solutions, and advantages of this disclosure clearer, the following further describes this disclosure in detail with reference to the accompanying drawings and the embodiments. It is to be understood that the specific embodiments described herein are merely used to explain this disclosure but are not intended to limit this disclosure.

A transformation relationship between a visual perception coordinate system and an ontology coordinate system that is obtained based on a spatial calibration method of a robot ontology coordinate system based on a visual perception device provided in the embodiments of this disclosure is applicable to a scheme of controlling a robot by using a robot decision model based on artificial intelligence (AI). For example, a second pose of a target object in the ontology coordinate system may be obtained according to the transformation relationship between the visual perception coordinate system and the ontology coordinate system and a first pose of the target object in the visual perception coordinate system. The robot decision model may make decisions according to the second pose of the target object and environment information in an image acquired by a camera. For example, the robot determines to cross the target object, grab the target object, or bypass the target object, and then controls, according to the result of decision, a target motion mechanism to move.

AI is a theory, a method, a technology, and an disclosure system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

CV is a science that studies how to use a machine to "see". To be more specific, CV performs recognition, tracking, and measurement on a target by using a camera and a computer instead of human eyes, and further performs graphics processing, so that the computer processes the target into an image suitable for human eyes to observe, or an image suitable for being transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

The spatial calibration method of a robot ontology coordinate system based on a visual perception device provided in the embodiments of this disclosure is applicable to an disclosure environment shown in FIG. 1. As shown in FIG. 1, a robot 120 may include a body 121 and target motion mechanisms 122. The target motion mechanisms 122 may be legs of the robot, and there may be four target motion mechanisms. A camera 110 is mounted on the body 121, and an end of the target motion mechanism 122 is connected to a target calibration object 140 by using a connecting member 130. It may be understood that the end of the target motion mechanism 122 may be directly connected to the target calibration object 140. The camera 110 is configured for visual perception, and the robot 120 may perform, according to a preset eye-in-foot calibration algorithm, the spatial calibration method of a robot ontology coordinate system based on a visual perception device provided in the embodiments of this disclosure, to perform eye-in-foot calibration and obtain a transformation relationship between a visual perception coordinate system (for example, a camera coordinate system) and an ontology coordinate system. It may be understood that in the embodiment of FIG. 1, a legged robot is used as an example for description. In other scenarios, other robots may be used, such as a robot whose motion mechanisms are hands.

Calibration of a robot ontology coordinate system provided in the embodiments of this disclosure may be eye-in-hand calibration or eye-in-foot calibration. The eye-in-hand calibration or eye-in-foot calibration is to perform measurement and calibration on a transformation relationship between a coordinate system of a visual perception device and a coordinate system of the robot. The spatial calibration method of a robot ontology coordinate system based on a visual perception device provided in the embodiments of this disclosure is applicable to eye-to-hand calibration or eye-to-foot calibration. During eye-to-hand calibration and eye-to-foot calibration, the visual perception device is not fixedly disposed on the motion mechanism, but is disposed outside the motion mechanism. For example, the visual perception device is fixedly disposed on the body of the robot, so that the transformation relationship between the coordinate system of the visual perception device and the ontology coordinate system of the robot is fixed. To be specific, during eye-to-hand calibration and eye-to-foot calibration, the transformation relationship between the coordinate system of the visual perception device and the ontology coordinate system of the robot is fixed, and does not change as the robot moves.

Figure 2:
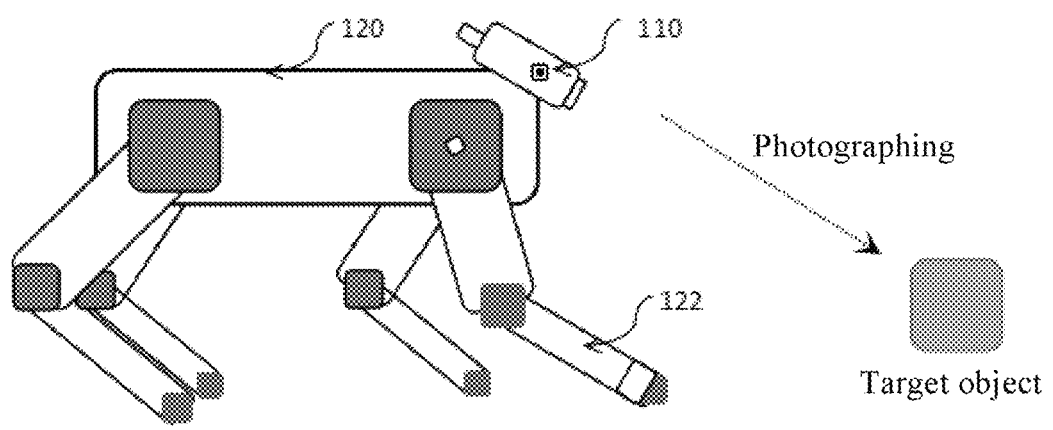
FIG. 2 is a diagram of an disclosure environment of a spatial calibration method of a robot ontology coordinate system based on a visual perception device according to some embodiments.

After the transformation relationship between the visual perception coordinate system and the ontology coordinate system is obtained according to the spatial calibration method of a robot ontology coordinate system based on a visual perception device provided in the embodiments of this disclosure, the robot may store the transformation relationship between the visual perception coordinate system and the ontology coordinate system, and control, by using the transformation relationship, the motion mechanism to move. For example, as shown in FIG. 2, the target object may be an obstacle or an object to be grabbed by the robot. During operation, such as field survey, the legged robot may perceive the external environment by using the camera 110, for example, perform photographing, to obtain a pose of the target object relative to the camera. The robot obtains a pose of the target object in the ontology coordinate system according to the pose of the target object relative to the camera and the transformation relationship between the visual perception coordinate system and the ontology coordinate system. In this way, the robot may control, according to the pose of the target object, the target motion mechanisms 122 to move. If the target object is an obstacle, the target motion mechanisms 122 may be controlled to avoid the obstacle according to the pose of the target object. If the target object is an object to be grabbed by the robot, the target motion mechanisms may be controlled to grab the target object according to the pose of the target object.

The robot 120 may communicate with the camera 110 by using a network or in a near field communication manner. For example, the robot may be an industrial robot or a domestic robot.

Figure 3:
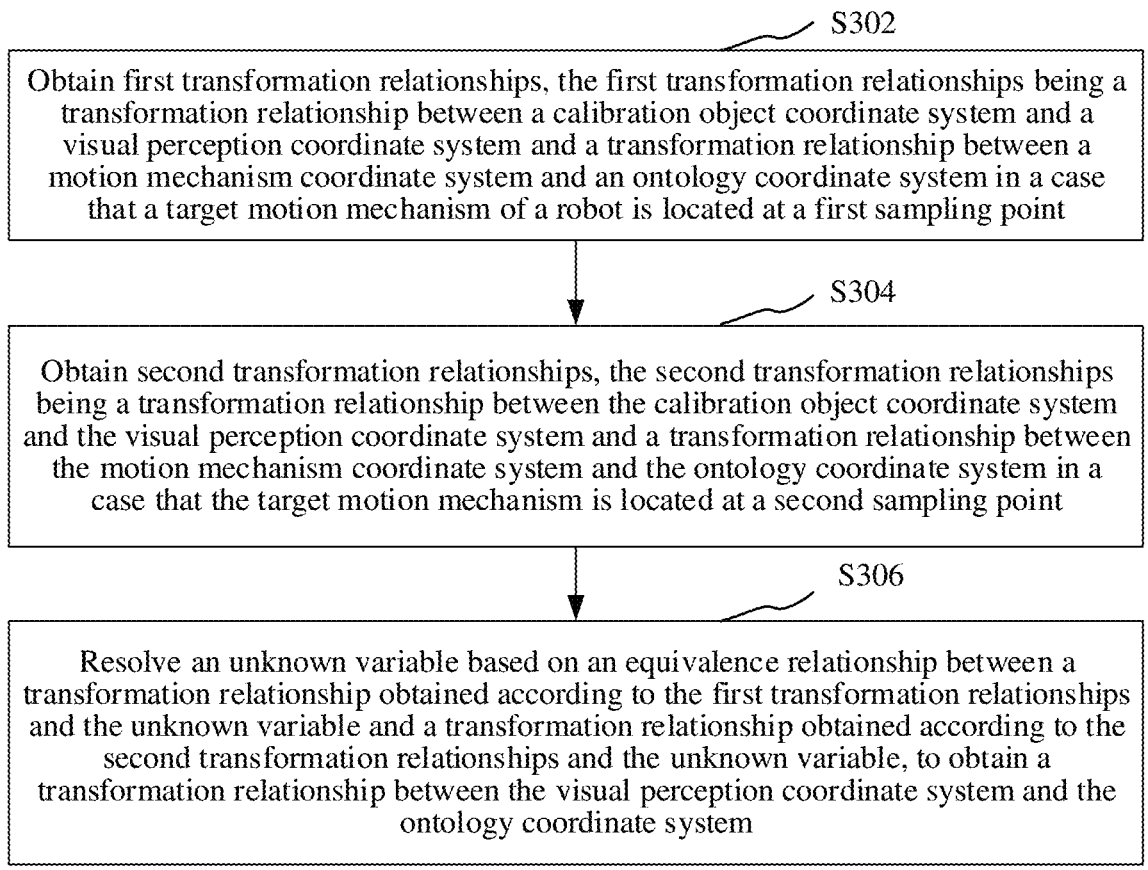
FIG. 3 is a schematic flowchart of a spatial calibration method of a robot ontology coordinate system based on a visual perception device according to some embodiments.

In some embodiments, as shown in FIG. 3, a spatial calibration method of a robot ontology coordinate system based on a visual perception device is provided. An example in which the method is applied to the robot in FIG. 1 is used for description. Certainly, the spatial calibration method of a robot ontology coordinate system based on a visual perception device may alternatively be performed by using another device, such as a server, and the server transmits the obtained transformation relationship between the visual perception coordinate system and the ontology coordinate system to the robot. The method includes the following steps:

Step S302. Obtain first transformation relationships, the first transformation relationships being a transformation relationship between a calibration object coordinate system and a visual perception coordinate system and a transformation relationship between a motion mechanism coordinate system and an ontology coordinate system when a target motion mechanism of a robot is located at a first sampling point.

Coordinates of a point may be different by using different coordinate systems as the reference. The transformation relationship refers to a relationship of transforming coordinates of a point from one coordinate system to another coordinate system. For example, for coordinates represented by using a coordinate system A, when the coordinates need to be represented by using a coordinate system B, coordinates represented by using the coordinate system B may be obtained according to the coordinates represented by using the coordinate system A and a transformation relationship from the coordinate system A to the coordinate system B. The transformation relationships may include at least one of a translation transformation relationship or a rotation transformation relationship. When the transformation relationships include the translation transformation relationship and the rotation transformation relationship, the transformation relationships may be represented by using a homogeneous transformation matrix. The homogeneous transformation matrix is used for indicating a spatial pose relationship between coordinate systems, where a pose refers to a location and a posture.

The robot is a machine apparatus automatically performing tasks. The robot may not only be controlled by human, but also can execute pre-arranged programs. A motion mechanism of the robot refers to a mechanism of the robot that can move, which may move according to control instructions, and may be, for example, hands or feet of the robot. A sampling point refers to a location for sampling, so as to perform transformation relationship calibration. There may be one or more first sampling points, and "more" means at least two. A location of the sampling point may be pre-arranged, or may be randomly selected. It may be understood that when the target motion mechanism is located at the sampling point, a target calibration object is within a field of view of a visual perception device, so that the visual perception device may perceive the target calibration object. When there are a plurality of sampling points, the sampling points may cover as much range as possible, to ensure the calibration accuracy.

The target calibration object refers to an object used for calibration. A size of the target calibration object may be pre-determined and may include lengths between feature points of the target calibration object. A specific calibration object may be set according to specific situation. For example, the calibration object may be a checkerboard, Apriltag, ArUco, or other graphics. Apriltag may be understood as a simplified QR code. ArUco is a trellis diagram of Hamming code.

Figure 4:
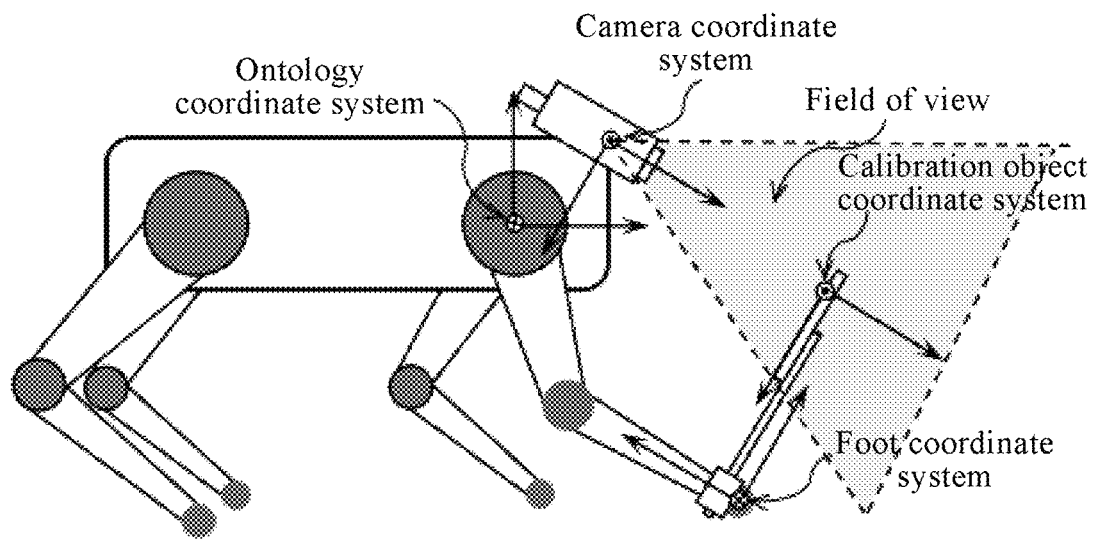
FIG. 4 is a schematic diagram of coordinate systems when a target motion mechanism is a right front leg of a legged robot according to some embodiments.

The calibration object coordinate system refers to a coordinate system used by the target calibration object. The visual perception coordinate system refers to a coordinate system used by the visual perception device, for example, a coordinate system used by a camera. The visual perception device may be, for example, a camera, and configured to perceive the external environment. The motion mechanism coordinate system refers to a coordinate system used by the target motion mechanism. When the motion mechanism includes a plurality of joints, the motion mechanism coordinate system is a coordinate system used by a location of the motion mechanism connected to the target calibration object. For example, when the target calibration object is connected to an end of the motion mechanism, the motion mechanism coordinate system is a coordinate system used by the end of the target motion mechanism, for example, a foot coordinate system. The ontology coordinate system refers to a coordinate system used by a body of the robot. The ontology coordinate system may also be referred to as a base coordinate system, and an original point of the ontology coordinate system of the robot may change according to the target motion mechanism. For example, FIG. 4 is a schematic diagram of coordinate systems when the target motion mechanism is a right front leg of a legged robot according to some embodiments. It may be seen from FIG. 4 that when the target motion mechanism is the right front leg of the legged robot, a base of the right front leg may be used as a location of the original point of the ontology coordinate system. Certainly, other points of the body may alternatively be used as the original point of the ontology coordinate system. For example, a point where a centroid of the body is located is used as the original point of the ontology coordinate system. In FIG. 4, a rectangle range formed by dashed lines represents a field of view of the visual perception device, for example, a photographing range of the camera. Setting of sampling points of the target motion mechanism need to ensure that the calibration object is within the field of view, so that the target calibration object may be photographed by the camera.

During calibration, the target calibration object is disposed on the target motion mechanism, for example, an end of the target motion mechanism. Therefore, a transformation relationship between the calibration object coordinate system and the motion mechanism coordinate system of the target motion mechanism remains unchanged at different sampling points. To ensure that the transformation relationship between the calibration object coordinate system and the motion mechanism coordinate system is constant, it needs to be ensured that a connecting member configured to connect the target calibration object with the target motion mechanism has sufficient rigidity, so as to reduce the effect of factors such as gravity on a relative location relationship of the target calibration object and the foot during calibration, and ensure that the relative location relationship of the calibration object and the foot is constant. For example, a relative location of the calibration object and the foot is kept within a preset relative location threshold, so as to reduce a calibration error.

The transformation relationship between the calibration object coordinate system and the visual perception coordinate system may be a transformation relationship from the calibration object coordinate system to the visual perception coordinate system, or may be a transformation relationship from the visual perception coordinate system to the calibration object coordinate system. The transformation relationship between the motion mechanism coordinate system and the ontology coordinate system may be a transformation relationship from the motion mechanism coordinate system to the ontology coordinate system, or may be a transformation relationship from the ontology coordinate system to the motion mechanism coordinate system. For example, the first transformation relationships may be the transformation relationship from the visual perception coordinate system to the calibration object coordinate system and the transformation relationship from the ontology coordinate system to the motion mechanism coordinate system. The transformation relationship between the calibration object coordinate system and the visual perception coordinate system may be represented by $H_{cam}^{marker}$. From a perspective of a coordinate system, $H_{cam}^{marker}$ represents a homogeneous transformation matrix from the visual perception coordinate system to the calibration object coordinate system. From a perspective of coordinates in a coordinate system, $H_{cam}^{marker}$ represents a homogeneous transformation matrix that transforms coordinates of points in the calibration object coordinate system into coordinates in the visual perception coordinate system. For example, coordinates represented in the visual perception coordinate system may be obtained by multiplying $H_{cam}^{marker}$ by coordinates represented in the calibration object coordinate system. H represents the homogeneous transformation matrix, "marker" represents the calibration object, and "cam" represents the visual perception device, for example, the camera. The transformation relationship between the ontology coordinate system and the motion mechanism coordinate system may be represented by $H_{base}^{foot}$, where "foot" represents the foot of the target motion mechanism, and "base" represents the body, that is, the base.

Specifically, the robot may control, by using a motion controller disposed in the robot, the target motion mechanism to move to the first sampling point, perform image acquisition on the target calibration object by using the visual perception device, to obtain a target image, and obtain the transformation relationship between the calibration object coordinate system and the visual perception coordinate system through calculation according to image coordinates of the target calibration object in the target image and a size of the target calibration object. Every time an image is acquired by using the visual perception device, the robot records angles of joints of the target motion mechanism, and obtains the transformation relationship between the motion mechanism coordinate system and the ontology coordinate system according to the angles of the joints of the target motion mechanism and a kinematic model of the robot. The kinematic model refers to coordinate system definitions of the joints of the target motion mechanism and connecting rod lengths. The connecting rod length refers to a length of a rod between connecting joints, and the kinematic model is set in advance.

In some embodiments, the first transformation relationships may be obtained according to transformation relationships that are obtained through a plurality of times of sampling. For example, every time one sampling point is arrived, the target motion mechanism, for example, a leg of the legged robot, and the calibration object may stay at the same pose for a period of time. In the period of time, the camera may perform a plurality of times of sampling on the target calibration object. The robot may perform statistics on transformation relationships obtained through the plurality of times of sampling, for example, resolve an average value or a geometric median, and obtain the first transformation relationships based on a statistics value, for example, use the statistics value as a value in the first transformation relationships. A statistics manner may alternatively be determined according to types of the transformation relationships. When the transformation relationships are rotation transformation relationships, an average value may be obtained through statistics and used as a value in the transformation relationships. When the transformation relationships are translation transformation relationships, a geometric median may be obtained through statistics and used as a value in the transformation relationships.

In some embodiments, when the transformation relationships include a rotation transformation relationship, the robot may obtain quaternions q that represent rotation transformation relationships and that are obtained through sampling, and resolve an average value of the quaternions q obtained through a plurality of times of sampling. An optimized quaternion q is converted into a rotation matrix $R_{3\times3}$. $R_{3\times3}$ indicates a rotation matrix with three rows and three columns, to represent the rotation transformation relationships.

In some embodiments, when the transformation relationships include a translation transformation relationship, the robot may obtain p that represents translation transformation relationships and that is obtained through each time of sampling, and resolve a geometric median of the translation transformation relationships p obtained through a plurality of times of sampling, to obtain an optimized p. p is a matrix with three rows and one column, and represents translation transformation relationships respectively corresponding to an x axis, a y axis, and a z axis. Resolving the geometric median refers to obtaining a target point from a coordinate point set formed by a plurality of coordinate points, and a sum of distances between the target point and the coordinates points in the coordinate point set is the smallest.

In some embodiments, when the transformation relationships include the rotation transformation relationship or the translation transformation relationship, the robot may combine the rotation matrix $R_{3\times3}$ and the optimized p, to obtain a homogeneous transformation matrix. Using a transformation relationship $H_{cam}^{marker}$ between the visual perception coordinate system and the calibration object coordinate system as an example, $H_{cam}^{marker}$ may be represented as follows:

$$H_{cam}^{marker} = \begin{bmatrix} R_{3\times3} & p \\ 0 & 1 \end{bmatrix}$$

Step S304. Obtain second transformation relationships, the second transformation relationships being a transformation relationship between the calibration object coordinate system and the visual perception coordinate system and a transformation relationship between the motion mechanism coordinate system and the ontology coordinate system when the target motion mechanism is located at a second sampling point.

Specifically, the second sampling point is different from the first sampling point. For example, a controller in the robot may control, according to a calibration control algorithm, the target motion mechanism to move from the first sampling point to the second sampling point. At the second sampling point, a transformation relationship between the calibration object coordinate system and the visual perception coordinate system is calibrated, and a transformation relationship between the motion mechanism coordinate system and the ontology coordinate system is calibrated. For a manner of obtaining the second transformation relationships, reference may be made to the manner of obtaining the first transformation relationships. The manner of obtaining the second transformation relationships may be the same as the manner of obtaining the first transformation relationships. For example, the robot may control, by using a motion controller disposed in the robot, the target motion mechanism to move from the first sampling point to the second sampling point, perform image acquisition on the target calibration object by using the visual perception device, to obtain a target image, and obtain the transformation relationship between the calibration object coordinate system and the visual perception coordinate system through calculation according to image coordinates of the target calibration object in the target image and a size of the target calibration object.

Step S306. Resolve an unknown variable based on an equivalence relationship between a transformation relationship obtained according to the first transformation relationships and the unknown variable and a transformation relationship obtained according to the second transformation relationships and the unknown variable, to obtain a transformation relationship between the visual perception coordinate system and the ontology coordinate system.

Specifically, the unknown variable refers to unknown data, and needs to be resolved. The computer device uses the transformation relationship between the visual perception coordinate system and the ontology coordinate system as the unknown variable. Because the target calibration object is disposed on the target motion mechanism, the transformation relationship between the motion mechanism coordinate system and the calibration object coordinate system remains unchanged when the target motion mechanism is located at the first sampling point and the second sampling point. The transformation relationship between the motion mechanism coordinate system and the calibration object coordinate system may be obtained according to the first transformation relationships and the unknown variable, or may be obtained according to the second transformation relationships and the unknown variable, that is, a transformation relationship obtained according to the first transformation relationships and the unknown variable and a transformation relationship obtained according to the second transformation relationships and the unknown variable are equivalent and are the same transformation relationship, that is, the transformation relationship between the motion mechanism coordinate system and the calibration object coordinate system. The first transformation relationships and the second transformation relationships are known, and therefore, the transformation relationship between the visual perception coordinate system and the ontology coordinate system may be resolved.

Figure 5:
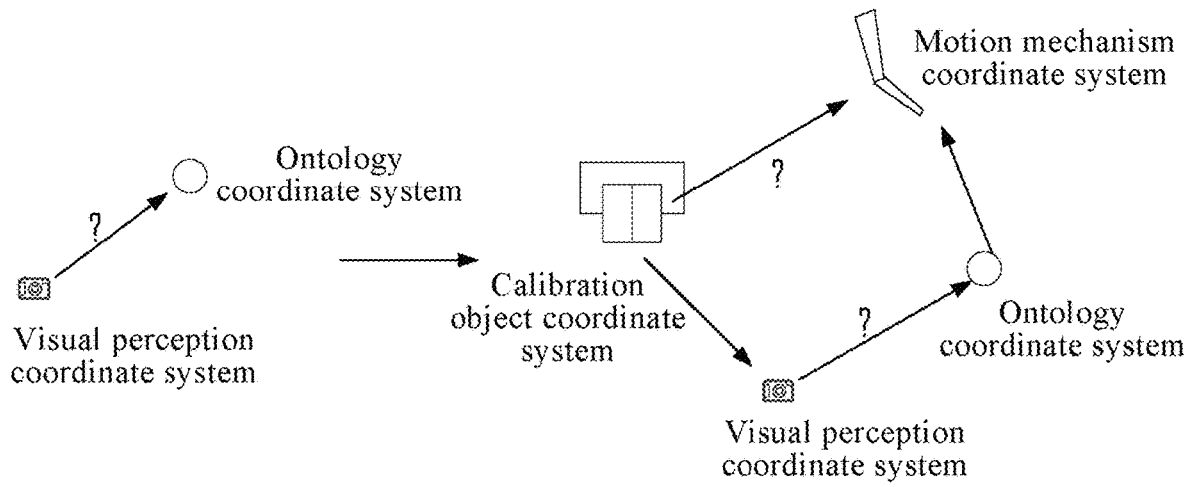
FIG. 5 is a schematic diagram of a principle of calculating a transformation relationship between a visual perception coordinate system and an ontology coordinate system according to some embodiments.

Referring to FIG. 5, the principle of a coordinate system transformation method provided in the embodiments of this disclosure is described below. When the visual perception device, such as an eye, is disposed on the body, that is, the eye is located outside the motion mechanism, the transformation relationship between the visual perception coordinate system and the ontology coordinate system needs to be calibrated. As shown in the left image in FIG. 5, the transformation relationship between the visual perception coordinate system and the ontology coordinate system is unknown. For some robots, such as a legged robot, because a foot of the legged robot lacks a connecting end plane design, absolute accuracy and repeatability of positioning are lower than that of a common industrial robot. In most cases, a camera sensor of the legged robot is mounted on the body of a base, and therefore, an overlapping range of a field of view and a motion space of the foot is relatively small. In this case, if the foot is photographed by a camera, it is difficult to perform calibration in a large range due to the low positioning accuracy and the small motion space overlapping range. If a suitable target calibration object is introduced, and the calibration object is disposed on the foot, on one hand, a calibration object with high positioning accuracy may be selected as required, and on the other hand, the overlapping range of the field of view of the camera and the motion space of the target calibration object is also increased. Therefore, the calibration accuracy may be improved. However, as shown in the right image in FIG. 5, after the target calibration object is introduced, a transformation relationship between the calibration object coordinate system and the motion mechanism coordinate system, such as a foot coordinate system, is also unknown, which introduces another unknown variable. In a scenario in which the eye is located outside the target motion mechanism, all transformation relationships between the calibration object coordinate system and the motion mechanism coordinate system are fixed at different sampling points, and all transformation relationships between the visual perception coordinate system and the ontology coordinate system are also fixed at different sampling points. The transformation relationship between the calibration object coordinate system and the motion mechanism coordinate system may be obtained according to a transformation relationship between the calibration object coordinate system and the visual perception coordinate system, a transformation relationship between the visual perception coordinate system and the ontology coordinate system, and a transformation relationship between the ontology coordinate system and the motion mechanism coordinate system. Therefore, formula (1) and formula (2) may be obtained.

$H_{foot1}^{base}$ indicates the transformation relationship between the motion mechanism coordinate system and the ontology coordinate system when the target motion mechanism is located at the first sampling point, $H_{cam}^{marker1}$ indicates the transformation relationship between the visual perception coordinate system and the calibration object coordinate system when the target motion mechanism is located at the first sampling point, $H_{foot2}^{base}$ indicates the transformation relationship between the motion mechanism coordinate system and the ontology coordinate system when the target motion mechanism is located at the second sampling point, and $H_{cam}^{marker2}$ indicates the transformation relationship between the visual perception coordinate system and the calibration object coordinate system when the target motion mechanism is located at the second sampling point. Because a calibration object is not required during actual operation of the robot, that is, a transformation relationship between the calibration object coordinate system and the motion mechanism coordinate system (such as the foot coordinate system) does not need to be known, the transformation relationship between the calibration object coordinate system and the motion mechanism coordinate system may be "sacrificed", and formula (3) may be obtained according to formula (1) and formula (2). In formula (3), $H_{cam}^{marker1}$, $H_{cam}^{marker2}$, $H_{foot1}^{base}$, $H_{foot2}^{base}$ have been obtained, and only $H_{base}^{cam}$ is unknown. Therefore, the unknown variable may be resolved.

$$H_{foot}^{marker} = H_{foot1}^{base} H_{base}^{cam} H_{cam}^{marker1} \quad (1)$$

$$H_{foot}^{marker} = H_{foot2}^{base} H_{base}^{cam} H_{cam}^{marker2} \quad (2)$$

$$H_{foot1}^{base} H_{base}^{cam} H_{cam}^{marker1} = H_{foot2}^{base} H_{base}^{cam} H_{cam}^{marker2} \quad (3)$$

In some embodiments, there may be one or more first sampling points, and there may be one or more second sampling points. For example, $H_{base}^{cam}$ includes a rotation transformation relationship and a translation transformation relationship, and there are a plurality of unknown values in the matrix thereof. To ensure the uniqueness of the unknown variable during resolving of the unknown variable, at least three sampling points need to be obtained: n1, n2, and n3. n1 may be used as the first sampling point, and n2 may be used as the second sampling point, to obtain an equation. n1 may be used as the first sampling point, and n3 may be used as the second sampling point, to obtain another equation. By combining the two equations, the unique transformation relationship between the visual perception coordinate system and the ontology coordinate system is resolved. It may be understood that, to improve the accuracy and applicability of the resolved transformation relationship between the visual perception coordinate system and the ontology coordinate system, more than three sampling points may be set as required, for example, 15 sampling points may be set.

In the foregoing spatial calibration method of a robot ontology coordinate system based on a visual perception device, the target calibration object is disposed on the target motion mechanism, and therefore, the transformation relationship between the motion mechanism coordinate system and the calibration object coordinate system remains unchanged when the target motion mechanism is located at the first sampling point and the second sampling point. The transformation relationship may be obtained according to the first transformation relationships and the transformation relationship between the visual perception coordinate system and the ontology coordinate system, or according to the second transformation relationships and the transformation relationship between the visual perception coordinate system and the ontology coordinate system. That is, transformation relationships between the motion mechanism coordinate system and the calibration object coordinate system calculated in the two manners are equivalent. Therefore, the first transformation relationships and the second transformation relationships are obtained, and the transformation relationship between the visual perception coordinate system and the ontology coordinate system is used as an unknown variable, to resolve the unknown variable based on an equivalence relationship, so that the transformation relationship between the visual perception coordinate system and the ontology coordinate system can be obtained efficiently and accurately, and the efficiency of obtaining the transformation relationship between the visual perception coordinate system and the ontology coordinate system can be improved.

Figure 6:
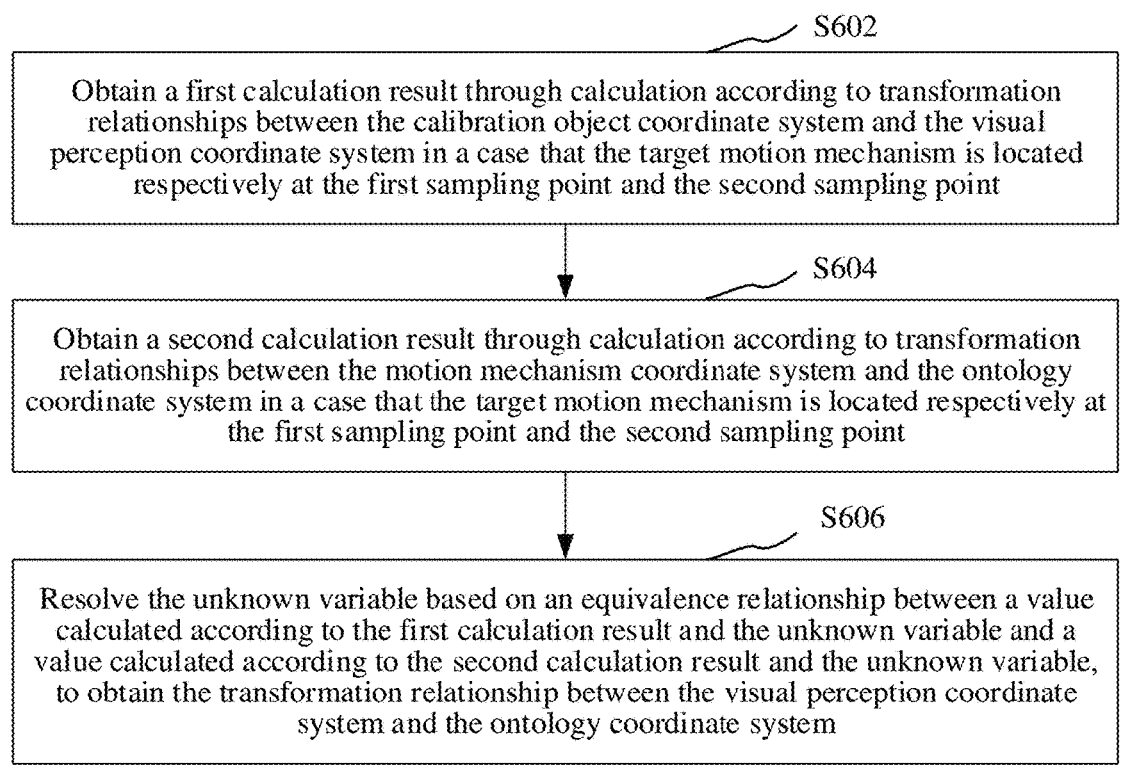
FIG. 6 is a schematic flowchart of resolving an unknown variable, to obtain a transformation relationship between a visual perception coordinate system and an ontology coordinate system according to some embodiments.

In some embodiments, as shown in FIG. 6, step S306 of resolving an unknown variable based on an equivalence relationship between a transformation relationship obtained according to the first transformation relationships and the unknown variable and a transformation relationship obtained according to the second transformation relationships and the unknown variable, to obtain a transformation relationship between the visual perception coordinate system and the ontology coordinate system includes:

Step S602. Obtain a first calculation result through calculation according to transformation relationships between the calibration object coordinate system and the visual perception coordinate system when the target motion mechanism is located respectively at the first sampling point and the second sampling point.

Specifically, the first calculation result is obtained according to the transformation relationship between the calibration object coordinate system and the visual perception coordinate system when the target motion mechanism is located at the first sampling point and the transformation relationship between the calibration object coordinate system and the visual perception coordinate system when the target motion mechanism is located at the second sampling point.

For example, the transformation relationship between the calibration object coordinate system and the visual perception coordinate system when the target motion mechanism is located at the first sampling point, for example, a homogeneous transformation matrix $(H_{cam}^{marker1})^{-1}$, may be obtained, where $((H_{cam}^{marker1})^{-1}$ indicates an inverse matrix of $H_{cam}^{marker1}$, and the transformation relationship between the visual perception coordinate system and the calibration object coordinate system when the target motion mechanism is located at the second sampling point, for example, a homogeneous transformation matrix $H_{cam}^{marker2}$, may be obtained. $H_{cam}^{marker2}$ is multiplied by $(H_{cam}^{marker1})^{-1}$, to obtain the first calculation result.

Step S604. Obtain a second calculation result through calculation according to transformation relationships between the motion mechanism coordinate system and the ontology coordinate system when the target motion mechanism is located respectively at the first sampling point and the second sampling point.

Specifically, the second calculation result is obtained according to the transformation relationship between the motion mechanism coordinate system and the ontology coordinate system when the target motion mechanism is located at the first sampling point and the transformation relationship between the motion mechanism coordinate system and the ontology coordinate system when the target motion mechanism is located at the second sampling point.

In some embodiments, the transformation relationship from the motion mechanism coordinate system to the ontology coordinate system when the target motion mechanism is located at the first sampling point is obtained and used as a first known value, the transformation relationship from the ontology coordinate system to the motion mechanism coordinate system when the target motion mechanism is located at the second sampling point is obtained and used as a second known value, and the first known value is multiplied by the second known value, to obtain the second calculation result.

Specifically, a transformation relationship from the motion mechanism coordinate system to the ontology coordinate system when the target motion mechanism is located at the first sampling point, such as a homogeneous transformation matrix $(H_{base}^{foot1})^{-1}$, may be obtained and used as a first known value, where the matrix $(H_{base}^{foot1})^{-1}$ indicates an inverse matrix of the matrix $H_{base}^{foot1}$. A transformation relationship from the ontology coordinate system to the motion mechanism coordinate system when the target motion mechanism is located at the second sampling point, that is, $H_{base}^{foot2}$, is obtained and used as a second known value. The second known value is multiplied by the first known value, to obtain the second calculation result.

Step S606. Resolve the unknown variable based on an equivalence relationship between a value calculated according to the first calculation result and the unknown variable and a value calculated according to the second calculation result and the unknown variable, to obtain the transformation relationship between the visual perception coordinate system and the ontology coordinate system.

Specifically, formula (4) may be obtained by performing transformation on formula (3). In formula (4), $H_{base}^{foot2}(H_{base}^{foot1})^{-1}$ indicates the second calculation result obtained in step S604 by multiplying a homogeneous transformation matrix between the motion mechanism coordinate system and the ontology coordinate system when the target motion mechanism is located at the second sampling point by a homogeneous transformation matrix between the motion mechanism coordinate system and the ontology coordinate system when the target motion mechanism is located at the first sampling point. $H_{cam}^{marker2}(H_{cam}^{marker1})^{-1}$ indicates the first calculation result obtained in step S602 by multiplying a homogeneous transformation matrix between the calibration object coordinate system and the visual perception coordinate system when the target motion mechanism is located at the second sampling point by a homogeneous transformation matrix between the calibration object coordinate system and the visual perception coordinate system when the target motion mechanism is located at the first sampling point. If the first calculation result is represented by B, and the second calculation result is represented by A, formula (4) is an eye-in-hand calibration or eye-in-foot calibration linear equation in a form of AX=XB. Therefore, it may be obtained according to formula (4) that, a value calculated according to the first calculation result and the unknown variable and a value calculated according to the second calculation result and the unknown variable may be equivalent. Because A and B are known, X, that is, the transformation relationship $H_{base}^{cam}$ between the visual perception coordinate system and the ontology coordinate system, may be resolved.

$$H_{base}^{foot2}(H_{base}^{foot1})^{-1}H_{base}^{cam}=H_{base}^{cam}H_{cam}^{marker2}(H_{cam}^{marker1})^{-1} \quad (4)$$

In the embodiments of this disclosure, formula (4) may be obtained by performing transformation on formula (3), that is, the linear equation in a form of AX=XB may be obtained. Four known values (the first transformation relationships and the second transformation relationships) in the equation are reduced to two known values, so that during resolving of the unknown variable, the calculation complexity may be reduced, and the efficiency of obtaining the transformation relationship may be improved.

In some embodiments, step S606 of resolving the unknown variable based on an equivalence relationship between a value calculated according to the first calculation result and the unknown variable and a value calculated according to the second calculation result and the unknown variable, to obtain the transformation relationship between the visual perception coordinate system and the ontology coordinate system includes: obtaining a current solution corresponding to the unknown variable; obtaining a first current value through calculation according to the current solution and the first calculation result, and obtaining a second current value through calculation according to the current solution and the second calculation result; obtaining a difference calculation result according to a difference between the first current value and the second current value, and adjusting the current solution in a direction of making the difference calculation result smaller, to obtain an updated current solution; and returning to the operation of obtaining the first current value through calculation according to the current solution and the first calculation result, and obtaining the second current value through calculation according to the current solution and the second calculation result, until the difference calculation result is less than a first threshold, and using the current solution as the transformation relationship between the visual perception coordinate system and the ontology coordinate system.

Specifically, the difference calculation result may be an absolute value of a different between the first current value and the second current value, or may be a sum of squares of differences between the first current value and the second current value. For example, for matrices, a difference calculation result of two matrices is obtained by performing summation on squares of differences between matrix values at the same matrix location. The first threshold may be set as required, for example, set to 0.01. A larger difference calculation result indicates a larger difference. The current solution is a currently obtained solution of the unknown variable. When resolving is performed for the first time, the current solution may be randomly obtained. Currently calculated XB in formula (4) refers to the operation of obtaining a first current value through calculation according to the current solution and the first calculation result, and currently calculated AX in formula (4) refers to the operation of obtaining a second current value through calculation according to the current solution and the second calculation result. According to formula (4), a final goal of currently calculated XB and currently calculated AX is equivalence. Therefore, the current solution may be adjusted according to a gradient descent method in a direction of making the difference calculation result smaller, to obtain an updated current solution. Then, the difference calculation result is obtained through calculation by using the updated current solution. When the difference calculation result is less than the first threshold, the finally obtained current solution is used as the transformation relationship between the visual perception coordinate system and the ontology coordinate system.

In an actual example, assuming that the current solution X is J1 when resolving is performed for the first time, A may be multiplied by J1, to obtain a first current value, and J1 is multiplied by B, to obtain a second current value. A difference calculation result between the first current value and the second current value is calculated, and if the difference calculation result is not less than a first threshold, a value in J1 is adjusted in a direction of making the difference calculation result smaller, to obtain J2 and use J2 as the current solution. A is multiplied by J2, to obtain a first current value, J2 is multiplied by B, to obtain a second current value, and this process is repeated, until the obtained difference calculation result is less than 0.01, to obtain final J, that is, a finally updated current solution, and use the updated current solution as the transformation relationship between the visual perception coordinate system and the ontology coordinate system.

In the method according to the embodiments of this disclosure, the current solution is continuously updated in a direction of making the difference calculation result smaller, until the difference calculation result is less than the first threshold, and the current solution is used as the transformation relationship between the visual perception coordinate system and the ontology coordinate system. In this way, the transformation relationship between the visual perception coordinate system and the ontology coordinate system that meets an error condition may be obtained, thereby improving the calibration accuracy and speed.

The operation of obtaining the transformation relationship between the calibration object coordinate system and the visual perception coordinate system when the target motion mechanism is located at the first sampling point is described below. It may be understood that when the target motion mechanism is located at the second sampling point, the transformation relationship between the calibration object coordinate system and the visual perception coordinate system may be obtained in the same manner.

In some embodiments, the operation of obtaining the transformation relationship between the calibration object coordinate system and the visual perception coordinate system when the target motion mechanism is located at the first sampling point includes: obtaining a projection matrix corresponding to a visual perception device; and performing calculation according to the projection matrix and a transformation relationship between the calibration object coordinate system and an image coordinate system when the target motion mechanism is located at the first sampling point, to obtain the transformation relationship between the calibration object coordinate system and the visual perception coordinate system when the target motion mechanism is located at the first sampling point.

The projection matrix may be a parameter that has been calibrated in the visual perception device, such as a camera. The image coordinate system refers to a coordinate system used by an image acquired by the visual perception device, and coordinates of pixels in the image may be obtained according to the image coordinate system. The transformation relationship between the calibration object coordinate system and the image coordinate system may be a transformation relationship from the calibration object coordinate system to the image coordinate system, or may be a transformation relationship from the image coordinate system to the calibration object coordinate system. For example, a homogeneous transformation matrix $H_{image}^{marker}$ from the image coordinate system to the calibration object coordinate system may be obtained, where "image" indicates an image. When $H_{image}^{marker}$ is obtained, a transformation relationship between the calibration object coordinate system and a camera coordinate system may be calculated by using the known camera projection matrix P and formula (5), that is, the projection matrix P is multiplied by $H_{image}^{marker}$, to obtain $H_{image}^{marker}$. For example, a homogeneous transformation matrix $H_{image}^{marker}$ from the visual perception coordinate system to the calibration object coordinate system is used as the transformation relationship between the calibration object coordinate system and the visual perception coordinate system.

$$H_{image}^{marker} = P H_{cam}^{marker} \qquad (5)$$

In some embodiments, the operation of obtaining the transformation relationship between the calibration object coordinate system and the image coordinate system includes: moving the target motion mechanism to the first sampling point, and controlling the visual perception device to perform image acquisition on the target calibration object, to obtain a target image; and obtaining, according to coordinates of the target calibration object in the target image and a size parameter corresponding to the target calibration object, the transformation relationship between the calibration object coordinate system and the image coordinate system when the target motion mechanism is located at the first sampling point.

Specifically, when the target motion mechanism moves to the first sampling point, the target motion mechanism may remain stationary, and the robot may control the camera to perform photographing on the target calibration object, to obtain a target image, and obtain coordinates of the calibration object in the image according to the definition of the image coordinate system. Because a size of the target calibration object is known, coordinates of the target calibration object in the calibration object coordinate system may be obtained according to the definition of the calibration object coordinate system. Then, because the coordinates of the target calibration object in the image coordinate system and the coordinates of the target calibration object in the calibration object coordinate system are known, the robot may obtain a homogeneous transformation matrix $H_{image}^{marker}$ from the image coordinate system to the calibration object coordinate system according to a principle that the coordinates of the target calibration object in the image coordinate system may be obtained by multiplying $H_{image}^{marker}$ by the coordinates of the target calibration object in the calibration object coordinate system.

In some embodiments, the coordinates of the target calibration object may be represented by using coordinates of feature points in the target calibration object. The feature point may be a characteristic point in the target calibration object, and may be set as required. For example, when the target calibration object is a checkerboard, coordinates of angle points in the checkerboard may be used for representing the coordinates of the target calibration object. The angle point refers to a location point of each lattice in the checkerboard.

The operation of obtaining the transformation relationship between the motion mechanism coordinate system and the ontology coordinate system when the target motion mechanism is located at the first sampling point is described below. It may be understood that when the target motion mechanism is located at the second sampling point, the transformation relationship between the motion mechanism coordinate system and the ontology coordinate system may be obtained in the same manner.

In some embodiments, the operation of obtaining the transformation relationship between the motion mechanism coordinate system and the ontology coordinate system when the target motion mechanism is located at the first sampling point includes: obtaining a transformation relationship between coordinate systems of adjacent joints in a joint sequence corresponding to the target motion mechanism when the target motion mechanism is located at the first sampling point, to obtain an adjacent transformation relationship set; and performing multiplication on transformation relationships in the adjacent transformation relationship set according to an arrangement sequence of joints in the joint sequence, to obtain the transformation relationship between the motion mechanism coordinate system and the ontology coordinate system when the target motion mechanism is located at the first sampling point.

Specifically, one target motion mechanism may include one or more joints. The joints in the joint sequence are sequentially arranged according to an arrangement sequence in the target motion mechanism. Transformation relationships between coordinate systems of adjacent joints may be calculated, and the adjacent transformation relationship set is formed by the transformation relationships between coordinate systems of adjacent joints. Then, multiplication is performed on the transformation relationships in the adjacent transformation relationship set according to the arrangement sequence of the joints in the joint sequence, to obtain the transformation relationship between the motion mechanism coordinate system corresponding to the target motion mechanism and the ontology coordinate system when the target motion mechanism is located at the first sampling point, which may be represented by using formula (6). m indicates a quantity of joints, $H_i^{i+1}$ indicates a transformation relationship from a coordinate system of the $i^{th}$ joint to a coordinate system of the $(i+1)^{th}$ joint, i being a positive integer, $H_m^{foot}$ indicates a transformation relationship from a coordinate system of the $m^{th}$ joint to the motion mechanism (foot) coordinate system, "Π" indicates multiplication operation, $R_{i,i+1}$ indicates a rotation transformation relationship from the $i^{th}$ joint to the $(i+1)^{th}$ joint, and $p_{i,i+1}$ indicates a translation transformation relationship from the $i^{th}$ joint to the $(i+1)^{th}$ joint.

$$H_{base}^{foot} = H_{base}^{1} \cdot \prod_{i=1}^{m-1} H_i^{i+1} \cdot H_m^{foot} \quad (6)$$

$$H_i^{i+1} = \begin{bmatrix} R_{i,i+1} & p_{i,i+1} \\ 0 & 1 \end{bmatrix} \quad (7)$$

Figure 7:
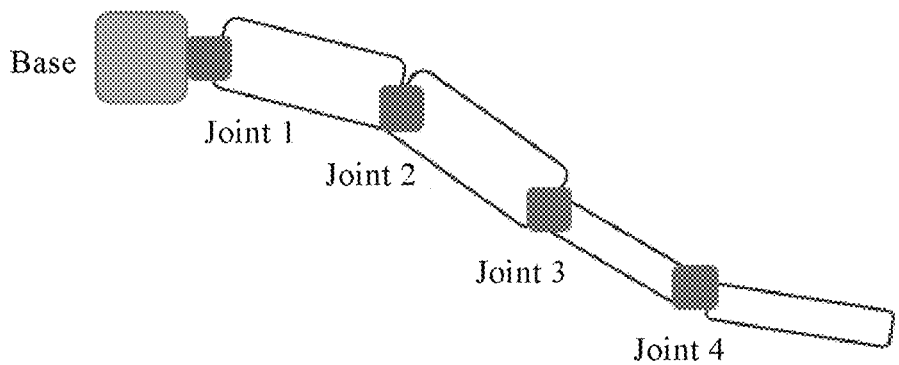
FIG. 7 is a schematic diagram of a target motion mechanism according to some embodiments.

For example, FIG. 7 is a schematic diagram of a target motion mechanism according to some embodiments. It may be seen from FIG. 7 that the target motion mechanism has four joints: a joint 1, a joint 2, a joint 3, and a joint 4, the target calibration object is disposed at an end of the target motion mechanism. Therefore, the transformation relationship between the motion mechanism coordinate system and the ontology coordinate system may be obtained by performing multiplication on a transformation relationship between a base coordinate system (the ontology coordinate system) and a coordinate system of the joint 1, a transformation relationship between a coordinate system of the joint 2 and a coordinate system of the joint 3, a transformation relationship between the coordinate system of the joint 3 and a coordinate system of the joint 4, and a transformation relationship between the coordinate system of the joint 4 and the end of the target motion mechanism.

In some embodiments, at the first sampling point, the robot controls the system to record angle data $θ_i$ of joints of the target motion mechanism, where i=1, 2, . . . , and m, m being a quantity of joints of the motion mechanism. In addition, a rotation matrix $R_{i,i+1}$ and a translation relationship between coordinate systems of two adjacent joints are obtained according to the known kinematic model of the robot, that is, definitions of coordinate systems of the joints in the target motion mechanism and connecting rod lengths $l_i$, where i=1, 2, . . . , and m−1, and the rotation matrix $R_{i,i+1}$ and the translation relationship $p_{i,i+1}$ form a corresponding homogeneous transformation matrix $$H_i^{i+1} = \begin{bmatrix} R_{i,i+1} & p_{i,i+1} \\ 0 & 1 \end{bmatrix}.$$

A Denavit and Hartenberg (DH) modeling method may be used to obtain coordinate systems of two adjacent joints. The DH modeling method is a kinematic modeling method of a robot, which implements coordinate transformation on a connecting rod by establishing a coordinate system on a joint and by using homogeneous coordinate transformation.

In some embodiments, when there are a plurality of motion mechanisms of the robot, another motion mechanism may use an ontology coordinate system that is the same as that of the target motion mechanism, or may use a different ontology coordinate system. When a different ontology coordinate system is used, a transformation relationship between the ontology coordinate system of the another motion mechanism and the ontology coordinate system of the target motion mechanism may be obtained, and a transformation relationship between the ontology coordinate system and the visual perception coordinate system corresponding to the another motion mechanism may be obtained according to the transformation relationship between the visual perception coordinate system and the ontology coordinate system corresponding to the target motion mechanism and a transformation relationship between the ontology coordinate system of the another motion mechanism and the ontology coordinate system of the target motion mechanism.

Figure 8:
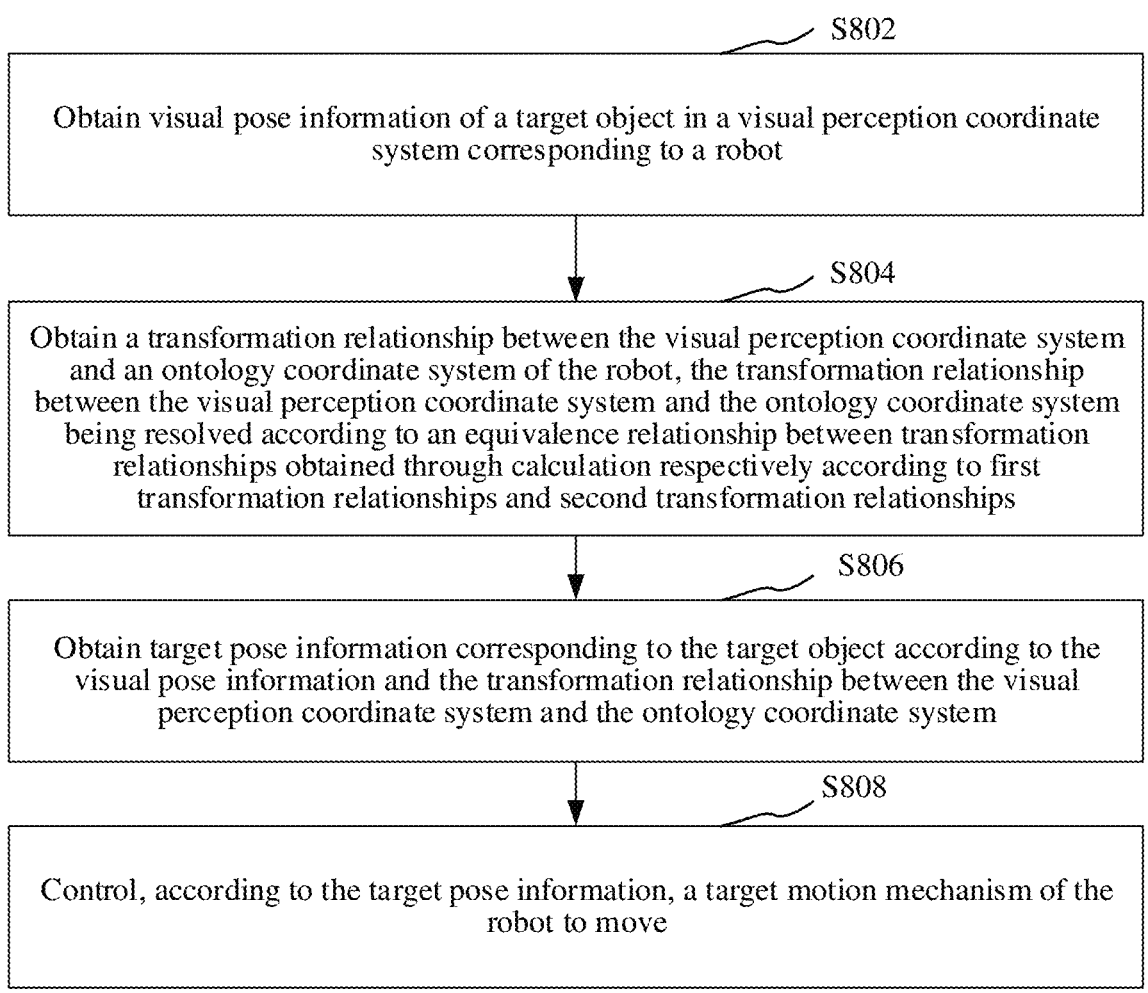
FIG. 8 is a schematic flowchart of a robot control method according to some embodiments.

In some embodiments, as shown in FIG. 8, a robot control method is provided. An example in which the method is applied to the robot in FIG. 1 is used for description. Certainly, the robot may be controlled by other devices, such as a server. The method includes the following steps:

Step S802. Obtain visual pose information of a target object in a visual perception coordinate system corresponding to a robot.

The visual pose information is location information and posture information corresponding to a target object in a visual perception coordinate system. The target object in the environment may be, for example, a rock, a table, or a product in a production line according to a specific situation.

Specifically, when operations need to be performed by using the robot, the robot may control the visual perception device in real time to perform image acquisition on the target object in the environment, to obtain a current image. After obtaining the current image, the robot may obtain visual pose information of the target object in the visual perception coordinate system according to information such as coordinates of the target object in the image and internal parameters of a camera.

Step S804. Obtain a transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships.

The first transformation relationships and the second transformation relationships are transformation relationships between a calibration object coordinate system and the visual perception coordinate system and transformation relationships between a motion mechanism coordinate system and the ontology coordinate system when the target motion mechanism is located at different sampling points, and During calibration, that is, when a transformation relationship between the visual perception coordinate system and the ontology coordinate system is calibrated, a target calibration object corresponding to the calibration object coordinate system is disposed on a target motion mechanism. For example, the first transformation relationships are a transformation relationship between the calibration object coordinate system and the visual perception coordinate system and a transformation relationship between the motion mechanism coordinate system and the ontology coordinate system when a target motion mechanism of the robot is located at a first sampling point. The second transformation relationships are a transformation relationship between the calibration object coordinate system and the visual perception coordinate system and a transformation relationship between the motion mechanism coordinate system and the ontology coordinate system when the target motion mechanism is located at a second sampling point.

It may be understood that the transformation relationship between the visual perception coordinate system and the ontology coordinate system is obtained by using the spatial calibration method of a robot ontology coordinate system based on a visual perception device provided in the embodiments of this disclosure. After the transformation relationship between the visual perception coordinate system and the ontology coordinate system is obtained, the robot may store the transformation relationship between the visual perception coordinate system and the ontology coordinate system. During operation, the robot obtains the pre-stored transformation relationship between the visual perception coordinate system and the ontology coordinate system.

Step S806. Obtain target pose information corresponding to the target object according to the visual pose information and the transformation relationship between the visual perception coordinate system and the ontology coordinate system.

Specifically, after the visual pose information is obtained, target pose information corresponding to the target object may be obtained according to the visual pose information and the transformation relationship between the visual perception coordinate system and the ontology coordinate system. For example, assuming that $H_{base}^{cam}$ is obtained, target pose information corresponding to the target object in the ontology coordinate system may be calculated by multiplying $H_{base}^{cam}$ by a pose represented by the visual perception coordinate system.

Step S808. Control, according to the target pose information, a target motion mechanism of the robot to move.

Specifically, after the target pose information corresponding to the target object is obtained, the robot may control, according to a relative pose relationship between current pose information of the target motion mechanism and the target pose information, the target motion mechanism to perform at least one of translation or rotation, to avoid the target object or grab the target object. For example, if the target object is an obstacle, the motion mechanism may be controlled to avoid the obstacle according to the pose of the target object. If the target object is an object to be grabbed by the robot, the motion mechanism may be controlled to grab the target object according to the pose of the target object.

In the foregoing robot control method, the transformation relationship between the visual perception coordinate system and the ontology coordinate system is resolved according to an equivalence relationship between transformation relationships obtained through calculation respectively according to the first transformation relationships and the second transformation relationships, and the first transformation relationships and the second transformation relationships are transformation relationships between the calibration object coordinate system and the visual perception coordinate system and transformation relationships between the motion mechanism coordinate system and the ontology coordinate system when the target motion mechanism is located at different sampling points. Therefore, the efficiency and accuracy of obtaining the transformation relationship between the visual perception coordinate system and the ontology coordinate system are high, which can improve the control accuracy of the robot.

The spatial calibration method of a robot ontology coordinate system based on a visual perception device provided in the embodiments of this disclosure is applicable to eye-in-hand calibration or eye-in-foot calibration for a robot, and a high-precise conversion relationship may be constructed between perception of the environment and motion control of a body in a robot. For example, online and automatic eye-in-foot calibration may be performed on a legged robot. A produced calibration object may be manually connected to an end of a motion mechanism, and a calibration process is automatically completed according to the spatial calibration method of a robot ontology coordinate system based on a visual perception device provided in the embodiments of this disclosure, so as to reduce human intervention as much as possible during calibration, and improve the efficiency and convenience of calibration. A transformation method of transformation relationships also has universality. The method is applicable to calibration of various robots, such as an industrial robot, and has loose requirements on the pattern type and the accuracy of a calibration object, which significantly reduces the production cost of the calibration object.

A legged robot is used as an example below, to describe the spatial calibration method of a robot ontology coordinate system based on a visual perception device provided in the embodiments of this disclosure. The method includes the following steps:

1. Mounting a target calibration object at an end of a motion mechanism.

Specifically, the legged robot may stand up and remain in a static balance status by using a calibration control algorithm in a control system, and a target calibration object is manually or automatically connected fixedly to a to-be-calibrated leg of the robot or any part of the last segment of the leg, such as a foot, by using a connecting member. The connecting member has sufficient rigidity, so as to ensure that a relative relationship between the calibration object and the foot is not affected by factors such as gravity and remain stable. After mounting of the target calibration object is completed, a projection of a center of gravity of the robot on the horizontal plane is moved, by using the calibration control algorithm, to a supporting region formed by supporting legs other than the to-be-calibrated leg, so as to ensure the static balance during calibration.

In some embodiments, the robot may stand up and keep balance by controlling the body of the robot, so as to provide an enough motion space for the to-be-calibrated leg. For some robots, it is designed that an enough motion space of legs may be ensured when the robot does not need to stand up. In this case, calibration may be performed when the robot does not stand up.

In some embodiments, an enough motion space of legs may alternatively be obtained by using an auxiliary device such as a supporting table or a hanger, so that the robot does not need to stand up.

2. Obtaining first transformation relationships. The first transformation relationships are a transformation relationship between a calibration object coordinate system and a visual perception coordinate system and a transformation relationship between a motion mechanism coordinate system and an ontology coordinate system when a target motion mechanism of the robot is located at a first sampling point.

Specifically, the robot may control the to-be-calibrated leg to move to a preset first sampling point. The target calibration object is photographed by using a camera, and angles of joints of the to-be-calibrated leg are recorded. The transformation relationship between the calibration object coordinate system and the visual perception coordinate system may be obtained through calculation according to an acquired image and information such as a projection matrix about the camera. Forward kinematic calculation is performed according to the angles of the joints of the to-be-calibrated leg and a kinematic model of the to-be-calibrated leg, to obtain the transformation relationship between the motion mechanism coordinate system and the ontology coordinate system.

At the first sampling point, a plurality of times of sampling may be performed, and a homogeneous transformation matrix is formed by using an average value of rotation transformation relationships and a geometric median of translation transformation relationships that are obtained through the plurality of times of sampling.

3. Obtaining second transformation relationships, the second transformation relationships being a transformation relationship between the calibration object coordinate system and the visual perception coordinate system and a transformation relationship between the motion mechanism coordinate system and the ontology coordinate system when the target motion mechanism is located at a second sampling point.

The robot may control the to-be-calibrated leg to move to a preset second sampling point. The target calibration object is photographed by using a camera, and angles of joints of the to-be-calibrated leg are recorded. The transformation relationship between the calibration object coordinate system and the visual perception coordinate system may be obtained through calculation according to an acquired image and information such as a projection matrix about the camera. The transformation relationship between the motion mechanism coordinate system and the ontology coordinate system may be obtained according to the angles of the joints of the to-be-calibrated leg and a kinematic model of the to-be-calibrated leg.

At the second sampling point, a plurality of times of sampling may be performed, and a homogeneous transformation matrix is formed by using an average value of rotation transformation relationships and a geometric median of translation transformation relationships that are obtained through the plurality of times of sampling.

4. Obtaining a first calculation result through calculation according to transformation relationships between the calibration object coordinate system and the visual perception coordinate system when the target motion mechanism is located at the first sampling point and the second sampling point.

Specifically, multiplication is performed on the obtained transformation relationship between the calibration object coordinate system and the visual perception coordinate system when the target motion mechanism is located at the first sampling point and the obtained transformation relationship between the calibration object coordinate system and the visual perception coordinate system when the target motion mechanism is located at the second sampling point, to obtain the first calculation result.

5. Obtaining a second calculation result through calculation according to transformation relationships between the motion mechanism coordinate system and the ontology coordinate system when the target motion mechanism is located at the first sampling point and the second sampling point.

Specifically, multiplication is performed on the obtained transformation relationship between the motion mechanism coordinate system and the ontology coordinate system when the target motion mechanism is located at the first sampling point and the obtained transformation relationship between the motion mechanism coordinate system and the ontology coordinate system when the target motion mechanism is located at the second sampling point, to obtain the second calculation result.

6. Resolving an unknown variable based on an equivalence relationship between a value calculated according to the first calculation result and the unknown variable and a value calculated according to the second calculation result and the unknown variable, to obtain the transformation relationship between the visual perception coordinate system and the ontology coordinate system.

Specifically, if the first calculation result is represented by B, and the second calculation result is represented by A, formula (4) is a calibration linear equation in a form of $AX=XB$. Therefore, X, that is, the transformation relationship between the visual perception coordinate system and the ontology coordinate system, may be obtained by resolving the linear equation. There may be one first sampling point and two second sampling points. In this way, a unique solution may be obtained by combining two obtained linear equation.

After the transformation relationship between the visual perception coordinate system and the ontology coordinate system is obtained, the transformation relationship between the visual perception coordinate system and the ontology coordinate system is stored into the robot. In this way, during operation, the robot may calculate a pose of the target object according to the transformation relationship between the visual perception coordinate system and the ontology coordinate system, so as to control, according to the pose of the target object, the target motion mechanism to move.

In the entire process of the eye-in-foot calibration method for the legged robot provided in the embodiments of this disclosure, the calibration object may be manually connected to the to-be-calibrated leg by human, and balance of the body of the robot is achieved by using the robot. The remaining calibration process may be automatically completed under the control of an algorithm, thereby significantly reducing human intervention and additional aids required in the calibration process. The calibration result is also directly stored in the control system of the robot, to be applied to the subsequent system operation, which greatly simplifies the eye-in-foot calibration process of the legged robot, and improves the calibration efficiency. In addition, the requirement on the processing accuracy of the calibration object may be set according to calibration accuracy, which can greatly reduce the production cost and difficulty of the calibration object, and improve universality.

It is to be understood that although the steps in the flowchart are sequentially shown according to indication of an arrow, the steps are not necessarily sequentially performed according to a sequence indicated by the arrow. Unless otherwise explicitly specified in this disclosure, execution of the steps is not strictly limited, and the steps may be performed in other sequences. In addition, at least some steps in the flowcharts may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 9:
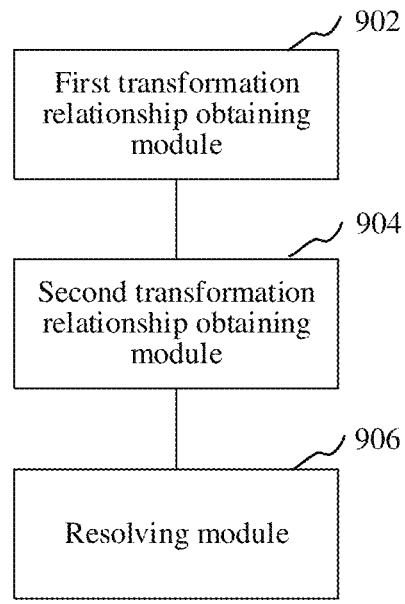
FIG. 9 is a structural block diagram of a spatial calibration apparatus of a robot ontology coordinate system based on a visual perception device according to some embodiments.

In some embodiments, as shown in FIG. 9, a spatial calibration apparatus of a robot ontology coordinate system based on a visual perception device is provided. The apparatus may be part of a computer device by using a software module, a hardware module, or a combination of the software module and the hardware module. The apparatus specifically includes: a first transformation relationship obtaining module 902, a second transformation relationship obtaining module 904, and a resolving module 906.

The first transformation relationship obtaining module 902 is configured to obtain first transformation relationships, the first transformation relationships being a transformation relationship between a calibration object coordinate system and a visual perception coordinate system and a transformation relationship between a motion mechanism coordinate system and an ontology coordinate system when a target motion mechanism of a robot is located at a first sampling point.

The second transformation relationship obtaining module 904 is configured to obtain second transformation relationships, the second transformation relationships being a transformation relationship between the calibration object coordinate system and the visual perception coordinate system and a transformation relationship between the motion mechanism coordinate system and the ontology coordinate system when the target motion mechanism is located at a second sampling point.

The resolving module 906 is configured to:

use the transformation relationship between the visual perception coordinate system and the ontology coordinate system as an unknown variable; and resolve the unknown variable based on an equivalence relationship between a transformation relationship obtained according to the first transformation relationships and the unknown variable and a transformation relationship obtained according to the second transformation relationships and the unknown variable, to obtain the transformation relationship between the visual perception coordinate system and the ontology coordinate system, a target calibration object corresponding to the calibration object coordinate system being disposed on the target motion mechanism.

In some embodiments, the resolving module 906 includes: a first calculation result obtaining unit, configured to obtain a first calculation result through calculation according to transformation relationships between the calibration object coordinate system and the visual perception coordinate system when the target motion mechanism is located respectively at the first sampling point and the second sampling point; a second calculation result obtaining unit, configured to obtain a second calculation result through calculation according to transformation relationships between the motion mechanism coordinate system and the ontology coordinate system when the target motion mechanism is located respectively at the first sampling point and the second sampling point; and a resolving unit, configured to resolve the unknown variable based on an equivalence relationship between a value calculated according to the first calculation result and the unknown variable and a value calculated according to the second calculation result and the unknown variable, to obtain the transformation relationship between the visual perception coordinate system and the ontology coordinate system.

In some embodiments, the resolving unit is configured to: obtain a current solution corresponding to the unknown variable; obtain a first current value through calculation according to the current solution and the first calculation result, and obtain a second current value through calculation according to the current solution and the second calculation result; obtain a difference calculation result according to a difference between the first current value and the second current value, and adjust the current solution in a direction of making the difference calculation result smaller, to obtain an updated current solution; and return to the operation of obtaining the first current value through calculation according to the current solution and the first calculation result, and obtaining the second current value through calculation according to the current solution and the second calculation result, until the difference calculation result is less than a first threshold, and use the current solution as the transformation relationship between the visual perception coordinate system and the ontology coordinate system.

In some embodiments, the second calculation result obtaining unit is configured to: obtain a transformation relationship from the motion mechanism coordinate system to the ontology coordinate system when the target motion mechanism is located at the first sampling point, and use the transformation relationship as a first known value; obtain a transformation relationship from the ontology coordinate system to the motion mechanism coordinate system when the target motion mechanism is located at the second sampling point, and use the transformation relationship as a second known value; and multiply the first known value by the second known value, to obtain the second calculation result.

In some embodiments, the first transformation relationship obtaining module 902 is configured to: obtain a projection matrix corresponding to a visual perception device; and perform calculation according to the projection matrix and a transformation relationship between the calibration object coordinate system and an image coordinate system when the target motion mechanism is located at the first sampling point, to obtain the transformation relationship between the calibration object coordinate system and the visual perception coordinate system when the target motion mechanism is located at the first sampling point.

In some embodiments, the first transformation relationship obtaining module 902 is configured to: move the target motion mechanism to the first sampling point, and control the visual perception device to perform image acquisition on the target calibration object, to obtain a target image; and obtain, according to coordinates of the target calibration object in the target image and a size parameter corresponding to the target calibration object, the transformation relationship between the calibration object coordinate system and the image coordinate system when the target motion mechanism is located at the first sampling point.

In some embodiments, the first transformation relationship obtaining module 902 is configured to: obtain a transformation relationship between coordinate systems of adjacent joints in a joint sequence corresponding to the target motion mechanism when the target motion mechanism is located at the first sampling point, to obtain an adjacent transformation relationship set; and perform multiplication on transformation relationships in the adjacent transformation relationship set according to an arrangement sequence of joints in the joint sequence, to obtain the transformation relationship between the motion mechanism coordinate system and the ontology coordinate system when the target motion mechanism is located at the first sampling point.

Figure 10:
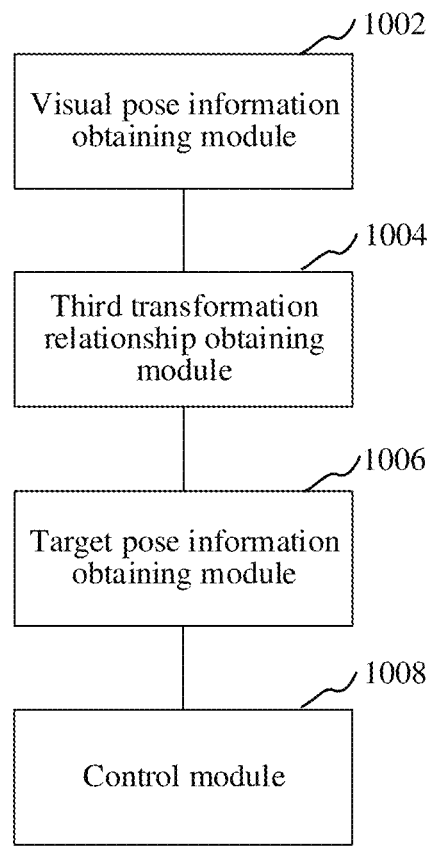
FIG. 10 is a structural block diagram of a robot control apparatus according to some embodiments.

In some embodiments, as shown in FIG. 10, a robot control apparatus is provided. The apparatus may be part of a computer device by using a software module, a hardware module, or a combination of the software module and the hardware module. The apparatus specifically includes: a visual pose information obtaining module 1002, a target transformation relationship obtaining module 1004, a target pose information obtaining module 1006, and a control module 1008.

The visual pose information obtaining module 1002 is configured to obtain visual pose information of a target object in a visual perception coordinate system corresponding to a robot.

The target transformation relationship obtaining module 1004 is configured to obtain a transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships.

The target pose information obtaining module 1006 is configured to obtain target pose information corresponding to the target object according to the visual pose information and the transformation relationship between the visual perception coordinate system and the ontology coordinate system.

The control module 1008 is configured to control, according to the target pose information, a target motion mechanism of the robot to move.

The first transformation relationships and the second transformation relationships are transformation relationships between a calibration object coordinate system and the visual perception coordinate system and transformation relationships between a motion mechanism coordinate system and the ontology coordinate system when the target motion mechanism is located at different sampling points, and a target calibration object corresponding to the calibration object coordinate system is disposed on the target motion mechanism during calibration.

For a specific limitation on the spatial calibration apparatus of a robot ontology coordinate system based on a visual perception device and the robot control apparatus, reference may be made to the limitation on the spatial calibration method of a robot ontology coordinate system based on a visual perception device and the robot control method. Details are not described herein again. Each module in the spatial calibration apparatus of a robot ontology coordinate system based on a visual perception device and the robot control apparatus may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a robot, and an internal structure diagram thereof may be shown in FIG. 11. The computer device includes a processor, a memory, and a network interface that are connected by using a system bus. The processor of the computer device is configured to provide computing and control capabilities. The memory of the computer device includes a non-volatile storage medium (or a non-transitory storage medium) and an internal memory. The non-volatile storage medium stores an operating system, computer-readable instructions, and a database. The internal memory provides an environment for running of the operating system and the computer-readable instructions in the non-volatile storage medium. The database of the computer device is configured to store transformation relationships. The network interface of the computer device is configured to communicate with an external terminal through a network connection. The computer-readable instructions, when executed by the processor, implement a spatial calibration method of a robot ontology coordinate system based on a visual perception device or a robot control method.

Figure 11:
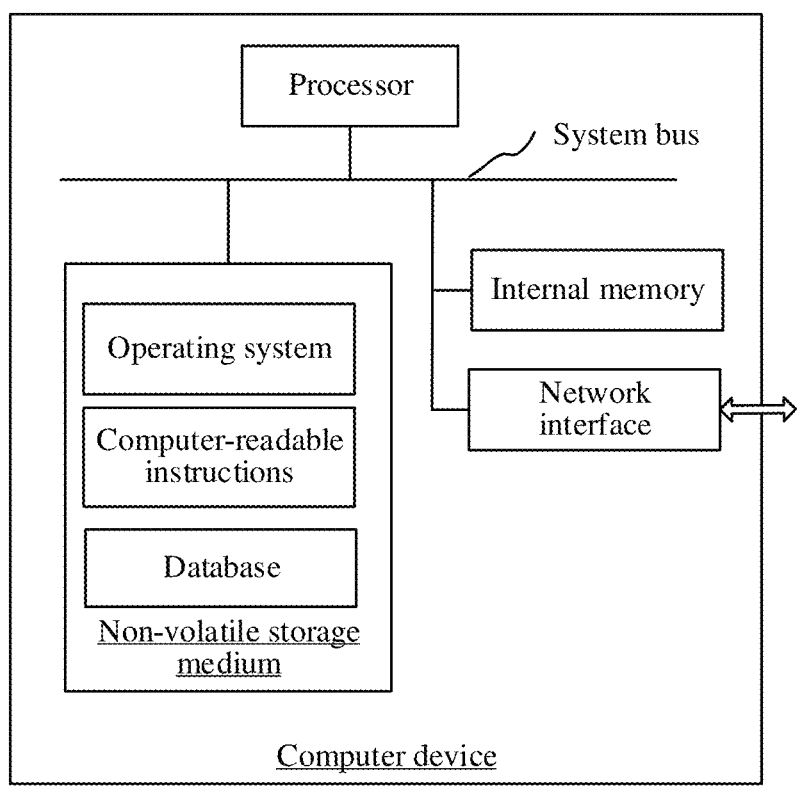
FIG. 11 is a diagram of an internal structure of a computer device according to some embodiments.

A person skilled in the art may understand that, the structure shown in FIG. 11 is only a block diagram of a part of a structure correlated to a solution of this disclosure and does not limit the computer device to which the solution of this disclosure is applied. Specifically, the computer device may include more or fewer members than those in the drawings, or include a combination of some members, or include different member layouts.

In some embodiments, a computer device is further provided, including a memory and a processor, the memory storing computer-readable instructions, the processor, when executing the computer-readable instructions, implementing the operations in the foregoing method embodiments.

In some embodiments, a non-transitory computer-readable storage medium is provided, storing computer-readable instructions, the computer-readable instructions, when executed by a processor, implementing the operations in the foregoing method embodiments.

In some embodiments, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the operations in the method embodiments.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium (or a non-transitory computer-readable storage medium). When the computer-readable instructions are executed, the procedures of the embodiments of the foregoing methods may be included. Any reference to a memory, a storage, a database, or another medium used in the embodiments provided in this disclosure may include at least one of a non-volatile memory and a volatile memory. The non-volatile memory (non-transitory computer-readable storage medium) may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this disclosure, which are described specifically and in detail, but cannot be construed as a limitation to the patent scope of this disclosure. For a person of ordinary skill in the art, several transformations and improvements can be made without departing from the idea of this disclosure. These transformations and improvements belong to the protection scope of this disclosure. Therefore, the protection scope of the patent of this disclosure shall be subject to the appended claims.

What is claimed is:

1. A spatial calibration method of a robot ontology coordinate system based on a visual perception device, performed by a computer device, the method comprising:
    obtaining first transformation relationships, the first transformation relationships including:
        a transformation relationship between a calibration object coordinate system and a visual perception coordinate system when a target motion mechanism of a robot is located at a first sampling point, and
        a transformation relationship between a motion mechanism coordinate system and an ontology coordinate system when the target motion mechanism of the robot is located at the first sampling point;
    obtaining second transformation relationships, the second transformation relationships including:
        a transformation relationship between the calibration object coordinate system and the visual perception coordinate system when the target motion mechanism is located at a second sampling point, and
        a transformation relationship between the motion mechanism coordinate system and the ontology coordinate system when the target motion mechanism is located at the second sampling point; and
    deriving a target transformation relationship based on an equivalence relationship between a transformation relationship obtained according to the first transformation relationships and the target transformation relationship and a transformation relationship obtained according to the second transformation relationships and the target transformation relationship, the target transformation relationship being a transformation relationship between the visual perception coordinate system and the ontology coordinate system, and a target calibration object corresponding to the calibration object coordinate system being disposed on the target motion mechanism.

2. The method according to claim 1, wherein deriving the target transformation relationship comprises:
    obtaining a first calculation result based on the transformation relationships between the calibration object coordinate system and the visual perception coordinate system when the target motion mechanism is located respectively at the first sampling point and the second sampling point;
    obtaining a second calculation result based on the transformation relationships between the motion mechanism coordinate system and the ontology coordinate system when the target motion mechanism is located respectively at the first sampling point and the second sampling point; and
    deriving the target transformation relationship based on an equivalence relationship between a first value calculated according to the first calculation result and the target transformation relationship and a second value calculated according to the second calculation result and the target transformation relationship.

3. The method according to claim 2, wherein deriving the target transformation relationship based on the first value and the second value comprises:
    obtaining a current solution corresponding to the target transformation relationship;
    obtaining a first current value through calculation according to the current solution and the first calculation result;
    obtaining a second current value through calculation according to the current solution and the second calculation result;
    obtaining a difference calculation result according to a difference between the first current value and the second current value and adjusting the current solution in a direction of making the difference calculation result smaller to obtain an updated current solution; and
    repeating to the operation of obtaining the first current value, obtaining the second current value, and adjusting the current solution until the difference calculation result is less than a first threshold, which current solution is used as the transformation relationship between the visual perception coordinate system and the ontology coordinate system.

4. The method according to claim 2, wherein obtaining the second calculation result comprises:
    obtaining a transformation relationship from the motion mechanism coordinate system to the ontology coordinate system when the target motion mechanism is located at the first sampling point, the transformation relationship being a first known value;
    obtaining a transformation relationship from the ontology coordinate system to the motion mechanism coordinate system when the target motion mechanism is located at the second sampling point, and the transformation relationship being a second known value; and
    multiplying the first known value by the second known value to obtain the second calculation result.

5. The method according to claim 1, wherein obtaining the first transformation relationships comprises:
    obtaining a projection matrix corresponding to a visual perception device; and
    performing calculation according to the projection matrix and a transformation relationship between the calibration object coordinate system and an image coordinate system when the target motion mechanism is located at the first sampling point to obtain the transformation relationship between the calibration object coordinate system and the visual perception coordinate system when the target motion mechanism is located at the first sampling point.

6. The method according to claim 5, wherein obtaining the first transformation relationships further comprises:
    moving the target motion mechanism to the first sampling point and controlling the visual perception device to perform image acquisition on the target calibration object to obtain a target image; and
    obtaining, according to coordinates of the target calibration object in the target image and a size parameter corresponding to the target calibration object, the transformation relationship between the calibration object coordinate system and the image coordinate system when the target motion mechanism is located at the first sampling point.

7. The method according to claim 1, wherein obtaining the first transformation relationships comprises:
obtaining a transformation relationship between coordinate systems of adjacent joints in a joint sequence corresponding to the target motion mechanism when the target motion mechanism is located at the first sampling point to obtain an adjacent transformation relationship set; and
performing multiplication on transformation relationships in the adjacent transformation relationship set according to an arrangement sequence of joints in the joint sequence to obtain the transformation relationship between the motion mechanism coordinate system and the ontology coordinate system when the target motion mechanism is located at the first sampling point.

8. A robot control method, performed by a computer device, the method comprising:
obtaining visual pose information of a target object in a visual perception coordinate system corresponding to a robot;
obtaining a target transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships;
obtaining target pose information corresponding to the target object according to the visual pose information and the transformation relationship between the visual perception coordinate system and the ontology coordinate system; and
controlling, according to the target pose information, a target motion mechanism of the robot to move,
the first transformation relationships and the second transformation relationships respectively including:
transformation relationships between a calibration object coordinate system and the visual perception coordinate system; and
transformation relationships between a motion mechanism coordinate system and the ontology coordinate system when the target motion mechanism is located at different sampling points.

9. The method according to claim 8, wherein obtaining the transformation relationship between the visual perception coordinate system and the ontology coordinate system of the robot comprises:
obtaining the first transformation relationships, the first transformation relationships including a transformation relationship between the calibration object coordinate system and the visual perception coordinate system and a transformation relationship between the motion mechanism coordinate system and the ontology coordinate system when the target motion mechanism is located at a first sampling point;
obtaining the second transformation relationships, the second transformation relationships including a transformation relationship between the calibration object coordinate system and the visual perception coordinate system and a transformation relationship between the motion mechanism coordinate system and the ontology coordinate system when the target motion mechanism is located at a second sampling point;
obtaining the target transformation relationship based on an equivalence relationship between a transformation relationship obtained according to the first transformation relationships and the target transformation relationship and a transformation relationship obtained according to the second transformation relationships and the target transformation relationship; and
a target calibration object corresponding to the calibration object coordinate system being disposed on the target motion mechanism during calibration.

10. The method according to claim 9, wherein obtaining the target transformation relationship comprises:
obtaining a first calculation result through calculation according to transformation relationships between the calibration object coordinate system and the visual perception coordinate system when the target motion mechanism is located respectively at the first sampling point and the second sampling point;
obtaining a second calculation result through calculation according to transformation relationships between the motion mechanism coordinate system and the ontology coordinate system when the target motion mechanism is located respectively at the first sampling point and the second sampling point; and
obtaining the target transformation relationship based on an equivalence relationship between a value calculated according to the first calculation result and the target transformation relationship and a value calculated according to the second calculation result and the target transformation relationship.

11. The method according to claim 10, wherein obtaining the second calculation result comprises:
obtaining a transformation relationship, as a first known value, from the motion mechanism coordinate system to the ontology coordinate system when the target motion mechanism is located at the first sampling point;
obtaining a transformation relationship, as a second know value, from the ontology coordinate system to the motion mechanism coordinate system when the target motion mechanism is located at the second sampling point; and
multiplying the first known value by the second known value to obtain the second calculation result.

12. A computer device, comprising a memory and a processor, the memory storing computer-readable instructions, the processor, when executing the computer-readable instructions, causing the computer device to perform steps comprising:
obtaining first transformation relationships, the first transformation relationships including:
a transformation relationship between a calibration object coordinate system and a visual perception coordinate system when a target motion mechanism of a robot is located at a first sampling point, and
a transformation relationship between a motion mechanism coordinate system and an ontology coordinate system when the target motion mechanism of the robot is located at the first sampling point;
obtaining second transformation relationships, the second transformation relationships including:
a transformation relationship between the calibration object coordinate system and the visual perception coordinate system when the target motion mechanism is located at a second sampling point, and
a transformation relationship between the motion mechanism coordinate system and the ontology coordinate system when the target motion mechanism is located at the second sampling point; and
deriving a target transformation relationship based on an equivalence relationship between a transformation relationship obtained according to the first transformation relationships and the target transformation relationship and a transformation relationship obtained according to the second transformation relationships and the target transformation relationship, the target transformation relationship being a transformation relationship between the visual perception coordinate system and the ontology coordinate system, and a target calibration object corresponding to the calibration object coordinate system being disposed on the target motion mechanism.

13. The computer device of claim 12, wherein the processor is further configured to execute the computer-readable instructions to cause the computer device to deriving the target transformation relationship by:
obtaining a first calculation result through calculation according to the transformation relationships between the calibration object coordinate system and the visual perception coordinate system when the target motion mechanism is located respectively at the first sampling point and the second sampling point;
obtaining a second calculation result through calculation according to the transformation relationships between the motion mechanism coordinate system and the ontology coordinate system when the target motion mechanism is located respectively at the first sampling point and the second sampling point; and
deriving the target transformation relationship based on an equivalence relationship between a first value calculated according to the first calculation result and the target transformation relationship and a second value calculated according to the second calculation result and the target transformation relationship.

14. The computer device of claim 13, wherein the processor is further configured to execute the computer-readable instructions to cause the computer device to derive the target transformation relationship based on the first value and the second value by:
obtaining a current solution corresponding to the target transformation relationship;
obtaining a first current value through calculation according to the current solution and the first calculation result;
obtaining a second current value through calculation according to the current solution and the second calculation result;
obtaining a difference calculation result according to a difference between the first current value and the second current value and adjusting the current solution in a direction of making the difference calculation result smaller to obtain an updated current solution; and
repeating to the operation of obtaining the first current value, obtaining the second current value, and adjusting the current solution until the difference calculation result is less than a first threshold, which current solution is used as the transformation relationship between the visual perception coordinate system and the ontology coordinate system.

15. The computer device of claim 13, wherein the processor is further configured to execute the computer-readable instructions to cause the computer device to obtain the second calculation result by:
obtaining a transformation relationship from the motion mechanism coordinate system to the ontology coordinate system when the target motion mechanism is located at the first sampling point, the transformation relationship being a first known value;
obtaining a transformation relationship from the ontology coordinate system to the motion mechanism coordinate system when the target motion mechanism is located at the second sampling point, and using the transformation relationship as a second known value; and
multiplying the first known value by the second known value to obtain the second calculation result.

16. The computer device of claim 12, wherein the processor is further configured to execute the computer-readable instructions to cause the computer device to obtain the first transformation relationships by:
obtaining a projection matrix corresponding to a visual perception device; and
performing calculation according to the projection matrix and a transformation relationship between the calibration object coordinate system and an image coordinate system when the target motion mechanism is located at the first sampling point to obtain the transformation relationship between the calibration object coordinate system and the visual perception coordinate system when the target motion mechanism is located at the first sampling point.

17. A robot, comprising a memory and a processor, the memory storing computer-readable instructions that, when executed by the processor, configure the robot to perform:
obtaining visual pose information of a target object in a visual perception coordinate system corresponding to the robot;
obtaining a target transformation relationship between the visual perception coordinate system and an ontology coordinate system of the robot, the transformation relationship between the visual perception coordinate system and the ontology coordinate system being resolved according to an equivalence relationship between transformation relationships obtained through calculation respectively according to first transformation relationships and second transformation relationships;
obtaining target pose information corresponding to the target object according to the visual pose information and the transformation relationship between the visual perception coordinate system and the ontology coordinate system; and
controlling, according to the target pose information, a target motion mechanism of the robot to move,
the first transformation relationships and the second transformation relationships respectively including:
transformation relationships between a calibration object coordinate system and the visual perception coordinate system; and
transformation relationships between a motion mechanism coordinate system and the ontology coordinate system when the target motion mechanism is located at different sampling points.

18. The robot of claim 17, wherein the processor is further configured to execute the computer-readable instructions to obtain the transformation relationship between the visual perception coordinate system and the ontology coordinate system of the robot by:
- obtaining the first transformation relationships, the first transformation relationships including a transformation relationship between the calibration object coordinate system and the visual perception coordinate system and a transformation relationship between the motion mechanism coordinate system and the ontology coordinate system when the target motion mechanism is located at a first sampling point;
- obtaining the second transformation relationships, the second transformation relationships including a transformation relationship between the calibration object coordinate system and the visual perception coordinate system and a transformation relationship between the motion mechanism coordinate system and the ontology coordinate system when the target motion mechanism is located at a second sampling point; and
- obtain the target transformation relationship based on an equivalence relationship between a transformation relationship obtained according to the first transformation relationships and the target transformation relationship and a transformation relationship obtained according to the second transformation relationships and the target transformation relationship, a target calibration object corresponding to the calibration object coordinate system being disposed on the target motion mechanism during calibration.

19. The robot of claim 18, wherein the processor is further configured to execute the computer-readable instructions to obtain the target transformation relationship by:
- obtaining a first calculation result through calculation according to transformation relationships between the calibration object coordinate system and the visual perception coordinate system when the target motion mechanism is located respectively at the first sampling point and the second sampling point;
- obtaining a second calculation result through calculation according to transformation relationships between the motion mechanism coordinate system and the ontology coordinate system when the target motion mechanism is located respectively at the first sampling point and the second sampling point; and
- obtaining the target transformation relationship based on an equivalence relationship between a value calculated according to the first calculation result and the target transformation relationship and a value calculated according to the second calculation result and the target transformation relationship.

20. The robot of claim 19, wherein the processor is further configured to execute the computer-readable instructions to the second calculation result by:
- obtaining a transformation relationship, as a first known value, from the motion mechanism coordinate system to the ontology coordinate system when the target motion mechanism is located at the first sampling point;
- obtaining a transformation relationship, as a second know value, from the ontology coordinate system to the motion mechanism coordinate system when the target motion mechanism is located at the second sampling point; and
- multiplying the first known value by the second known value to obtain the second calculation result.

* * * * *